(12) United States Patent
Belanger et al.

(10) Patent No.: US 8,596,654 B2
(45) Date of Patent: Dec. 3, 2013

(54) SERVICE CART

(75) Inventors: Martin Belanger, Montreal (CA); Mathieu Boivin, Montreal (CA); Martin Gauthier, St-Hippolyte (CA)

(73) Assignee: Norduyn Inc., Montreal (CA)

( * ) Notice: Subject to any disclaimer, the term of this patent is extended or adjusted under 35 U.S.C. 154(b) by 191 days.

(21) Appl. No.: 13/132,929

(22) PCT Filed: Dec. 7, 2009

(86) PCT No.: PCT/CA2009/001771
§ 371 (c)(1),
(2), (4) Date: Jun. 5, 2011

(87) PCT Pub. No.: WO2010/063120
PCT Pub. Date: Jun. 10, 2010

(65) Prior Publication Data
US 2011/0233882 A1    Sep. 29, 2011

Related U.S. Application Data

(60) Provisional application No. 61/120,477, filed on Dec. 7, 2008, provisional application No. 61/120,502, filed on Dec. 8, 2008.

(51) Int. Cl.
*B62B 3/00* (2006.01)

(52) U.S. Cl.
USPC .................. 280/47.34; 312/223.1; 312/321.5

(58) Field of Classification Search
USPC .................. 280/47.34, 47.35, 47.36, 47.371; 312/223.1, 321.5, 409
See application file for complete search history.

(56) References Cited

U.S. PATENT DOCUMENTS

| | | |
|---|---|---|
| 3,625,397 A | 12/1971 | Shelly |
| 3,877,744 A | 4/1975 | Miller |
| 3,951,426 A | 4/1976 | Shaffer |
| 3,987,871 A | 10/1976 | Nordskog |
| 4,073,369 A | 2/1978 | Nordskog |
| RE30,623 E | 5/1981 | Schulz |
| 5,001,977 A | 3/1991 | Tracy |
| 5,028,761 A | 7/1991 | Oda |

(Continued)

FOREIGN PATENT DOCUMENTS

| | | |
|---|---|---|
| EP | 0046414 | 2/1982 |
| EP | 0080313 | 6/1983 |

(Continued)

OTHER PUBLICATIONS

Patent Cooperation Treaty, PCT International Search Report, Jul. 12, 2009, 3 pages, PCT/CA2009/001771.

(Continued)

*Primary Examiner* — John Walters
(74) *Attorney, Agent, or Firm* — Mathieu Audet

(57) ABSTRACT

A service cart adapted to be moved along an aisle is provided, the service cart comprising a body defining an upper portion, a lower portion and two opposed lateral portions respectively disposed between the upper and the bottom portions, the portions being interconnected with intervening curved portions to form a continuous wall thereof and at least one longitudinal opening; wheels attached to a lower portion of the body for supporting the body; and a closing device for substantially closing the longitudinal opening. A method of manufacturing a service cart and a service cart kit are also provided.

19 Claims, 20 Drawing Sheets

(56) References Cited

U.S. PATENT DOCUMENTS

| | | |
|---|---|---|
| 5,056,194 A | 10/1991 | Huber |
| 5,069,466 A | 12/1991 | Propst |
| 5,449,232 A | 9/1995 | Westbrooks, Jr. |
| 5,749,193 A | 5/1998 | Bucher |
| 5,785,202 A | 7/1998 | Stephan |
| 5,829,767 A | 11/1998 | Grossman |
| 5,947,494 A | 9/1999 | Thogersen |
| 5,979,917 A | 11/1999 | Thogersen |
| 6,034,355 A | 3/2000 | Naderi |
| 6,106,084 A | 8/2000 | Thogersen |
| 6,234,498 B1 | 5/2001 | Saku |
| 6,425,649 B2 * | 7/2002 | Kasuya ................. 312/409 |
| 6,460,952 B1 | 10/2002 | Tryon |
| 6,474,677 B2 | 11/2002 | Kasuya |
| 6,629,581 B2 | 10/2003 | Lambiaso |
| 7,044,335 B2 | 5/2006 | Aguirre |
| 7,287,820 B2 | 10/2007 | Van Loon |
| 7,394,042 B2 | 7/2008 | Fortmann |
| 7,444,830 B2 | 11/2008 | Moran |
| 7,458,441 B2 | 12/2008 | Hu |
| 7,544,915 B2 * | 6/2009 | Hu ................. 219/387 |
| 7,661,459 B2 | 2/2010 | Wesley |
| 7,814,638 B2 | 10/2010 | Schalla |
| 2001/0009347 A1 | 7/2001 | Kasuya |
| 2001/0010419 A1 | 8/2001 | Kasuya |
| 2003/0042073 A1 | 3/2003 | Lambiaso |
| 2004/0207168 A1 | 10/2004 | Raab |
| 2004/0226960 A1 | 11/2004 | Aguirre |
| 2005/0193760 A1 | 9/2005 | Moran |
| 2005/0218615 A1 | 10/2005 | Hu |
| 2006/0055290 A1 * | 3/2006 | Schalla ................. 312/223.1 |
| 2006/0070814 A1 | 4/2006 | Hu |
| 2008/0042405 A1 | 2/2008 | Hu |
| 2008/0116773 A1 | 5/2008 | Van Loon |
| 2008/0120187 A1 | 5/2008 | Wesley |
| 2008/0172295 A1 | 7/2008 | Watson |
| 2008/0172855 A1 | 7/2008 | Schalla |
| 2008/0203043 A1 | 8/2008 | Poortvliet |
| 2008/0216368 A1 | 9/2008 | Delamere |
| 2008/0276840 A1 | 11/2008 | Van Loon |
| 2009/0055290 A1 | 2/2009 | Harris |
| 2010/0129184 A1 | 5/2010 | Thogersen |
| 2010/0140890 A1 | 6/2010 | Boivin |
| 2010/0155391 A1 | 6/2010 | Koschberg |
| 2010/0243801 A1 | 9/2010 | Saint-Jalmes |
| 2011/0006496 A1 | 1/2011 | Knoppers |

FOREIGN PATENT DOCUMENTS

| | | |
|---|---|---|
| EP | 0289258 | 11/1988 |
| EP | 470149 | 2/1992 |
| EP | 0645129 | 3/1995 |
| EP | 678438 | 10/1995 |
| EP | 0700820 | 3/1996 |
| EP | 855868 | 8/1998 |
| EP | 0922412 | 6/1999 |
| EP | 0922413 | 6/1999 |
| EP | 0922414 | 6/1999 |
| EP | 0922415 | 6/1999 |
| EP | 936334 | 8/1999 |
| EP | 999967 | 5/2000 |
| EP | 1055528 | 11/2000 |
| EP | 1125520 | 8/2001 |
| EP | 1125521 | 8/2001 |
| EP | 1335837 | 8/2003 |
| EP | 1022185 | 10/2005 |
| EP | 1551709 | 3/2006 |
| EP | 1592614 | 9/2006 |
| EP | 1700764 | 9/2006 |
| EP | 1308110 | 3/2007 |
| EP | 1542565 | 9/2007 |
| EP | 2246243 | 11/2010 |
| WO | 9012721 | 4/1990 |
| WO | 9101098 | 2/1991 |
| WO | 9202160 | 2/1992 |
| WO | 9701475 | 1/1997 |
| WO | 9739653 | 10/1997 |
| WO | 9739654 | 10/1997 |
| WO | 9906260 | 7/1998 |
| WO | 9941479 | 8/1999 |
| WO | 0021830 | 4/2000 |
| WO | 0219231 | 3/2002 |
| WO | 0242093 | 5/2002 |
| WO | 03023993 | 3/2003 |
| WO | 2004028301 | 4/2004 |
| WO | 2004103887 | 12/2004 |
| WO | 2005085075 | 9/2005 |
| WO | 2006093410 | 9/2006 |
| WO | 2006093412 | 9/2006 |
| WO | 2007023318 | 3/2007 |
| WO | 2007061622 | 5/2007 |
| WO | 2008020084 | 2/2008 |
| WO | 2008063403 | 5/2008 |
| WO | 2008067428 | 6/2008 |
| WO | 2008070715 | 6/2008 |
| WO | 2008070835 | 6/2008 |
| WO | 2008079345 | 7/2008 |
| WO | 2009008707 | 1/2009 |
| WO | 2009120067 | 10/2009 |
| WO | 2010020964 | 2/2010 |
| WO | 2010046479 | 4/2010 |
| WO | 2010063120 | 6/2010 |
| WO | 2010084005 | 7/2010 |

OTHER PUBLICATIONS

Patent Cooperation Treaty, PCT Written Opinion of the International Searching Authority, Jul. 12, 2009, 5 pages, PCT/CA2009/001771.

* cited by examiner

SERVICE CART

CROSS-REFERENCE

This United States patent application is a National Phase Application of International Application No. PCT/CA2009/001771, filed Dec. 7, 2009, entitled SERVICE CART; which claims the benefit of U.S. Provisional Application No. 61/120,477, filed Dec. 7, 2008, entitled GALLEY CART; and the benefit of U.S. Provisional Application No. 61/120,502, filed Dec. 8, 2008, entitled GALLEY CART PROCESS; which are incorporated herein by reference.

FIELD OF THE INVENTION

This invention relates generally to a cart for moving objects. More precisely, the present invention relates to a service cart for use in an airplane or another vehicle.

BACKGROUND OF THE INVENTION

The transportation industry is in quest of energy efficiency. The energy needed to move an object is mainly determine by the following equation:

$$E = \tfrac{1}{2} m \cdot v^2$$

It is well known that a mass (m) reduction will decrease the energy (E) required to move an object. Therefore, the mass of a vehicle should be reduced to improve energy efficiency of the vehicle.

Various strategies can be used to reduce the mass of a vehicle. Either the mass of the vehicle itself is reduced or the mass of the object it carries is reduced.

Airplanes are weight sensitive for obvious reasons that will not be discussed here. Airlines are cost conscious and are in quest of reducing their exploitation cost. One cost reducing strategy is to use lighter parts and equipments used inside the airplane to lighten the airplane. One of these equipments is the service cart that is used to carry passengers' food, beverages and other goods.

However, service carts used in aircrafts are subjected to many technical requirements that must be considered closely. Among others, mechanical resistance and fire resistance requirements are mandatory and have a direct impact on the design of the service cart and the choice of material that can be used to manufacture the service cart.

Some service cart uses are more restrictive than others. For instance, service carts dedicated to be used in the aeronautic industry must comply with mandatory regulations. For example, when regulations apply to fire resistance, the material should carefully be selected and the manufacturing method needs to be adapted for the selected material. Vertical burn test (FAR 25.853), OSU heat release (65/65), smoke toxicity and smoke density are other possible requirements. It sometimes happens that legacy-manufacturing methods are not adapted to be used with the material suitable to meet the technical requirements and some challenges must be overcome to build regulation compliant cart parts.

Other energy saving considerations exist in relation with a service cart. The thermal efficiency of the service cart is one of them since it takes energy to cool or heat the content of the service cart. The saving is not made through a mass reduction but by restricting the amount of energy required to cool or to warm the service cart and, consequently, the size of the associated cooling or warming device. It is therefore desirable to use a material having insulation capacity thereof.

Other deficiencies will become apparent to one skilled in the art to which the invention pertains in view of the following summary and detailed description with its appended figures.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description of exemplary embodiments that is presented later.

Therefore, one object of the present invention improves at least some of the deficiencies associated with the drawbacks identified above.

It is one object of the present invention to provide a composite materials service cart. The composite materials construction provides strong mechanical resistance while remaining relatively light. The composite materials construction of the service cart also ensures global mechanical integrity given the limited number of parts affixed thereto.

Another object of the present invention provides a lightweight, yet sturdy composite materials service cart.

One object of the invention provides a fire resistant composite materials service cart for use in airplanes.

Another object of the invention provides a composite materials monocoque service cart.

One other object of the invention provides a composite materials service cart body having a wall of variable thickness thereof.

One additional object of the invention provides a composite materials service cart body having planar wall portions interconnected with curved wall portions to form continuous wall thereof.

Another object of the present invention provides service cart at least partially built with composite materials comprising Phenolic resin.

An object of the invention provides a monocoque body service cart adapted to receive an extendable tablet therein in a first configuration and adapted to receive an extendable tablet thereon in a second configuration.

Another object of the present invention provides a composite materials service cart available in a full size configuration adapted to accommodate at least two longitudinal openings and available in a half size configuration adapted to accommodated at least one longitudinal opening.

One aspect of the invention provides a composite materials service cart having a tubular body with a wall secured thereto to close one axial end of the tubular body to define a half size configuration service cart.

One object of the invention provides a composite materials service cart having improved thermodynamic efficiency to keep the content cold or hot.

An aspect of the invention provides a doorframe adapted to substantially seal a corresponding door opening on the composite materials service cart, the doorframe comprising cooperating extruded elements having the same section.

Another aspect of the invention provides a service cart door made of composite materials with non-protruding latch portion adapted to secure the service cart door in a desired position.

An aspect of the present invention provides a composite materials service cart having a removable wheelbase adapted to support the body of the service cart when secured thereto.

Another aspect of the present invention provides a service cart adapted to be moved along an aisle, the service cart comprising a body defining an upper portion, a lower portion and two opposed lateral portions respectively disposed between the upper and the bottom portions, the portions being interconnected with intervening curved portions to form a continuous wall thereof and at least one longitudinal opening; wheels attached to a lower portion of the body for supporting the body; and a closing device for substantially closing the longitudinal opening. One other aspect of the invention provides a service cart comprising substantially continuous bin-support rails having vents therein adapted to allow venting therethrough.

One additional aspect of the invention provides a service cart kit adapted to be moved along an aisle, the service cart kit comprising a first size service cart comprising a first body having a first longitudinal length and defining two opposed openings; wheels attached to a lower portion of the body for supporting the body; and two closing devices pivotally attached to the body and adapted to substantially mate with their respective opening, and a second size service cart comprising a second body having a second longitudinal length and defining one opening, the second longitudinal length being smaller than the first longitudinal length; wheels attached to a lower portion of the body for supporting the body; and one closing device pivotally attached to the body and adapted to mate with the opening.

Another aspect of the present invention provides a method of manufacturing a service cart adapted to be moved along an aisle, the method comprising providing a body comprising an upper portion, a lower portion and two opposed lateral portions respectively disposed between the upper and the bottom portions, the portions being interconnected with intervening curved portions to form a continuous wall thereof, the body defining a longitudinal opening thereof, providing a set of wheels adapted to be attached to the lower portion of the body for supporting the service cart; and securing the set of wheels to the body.

Therefore, it is an aim of the present invention to provide an improved service cart that is light, easy to manufacture and inexpensive over the existing service cart.

These and other advantages and features of the present invention will become apparent from the following description and the attached drawings.

DESCRIPTION OF EMBODIMENT(S) OF THE INVENTION

Figure 1:
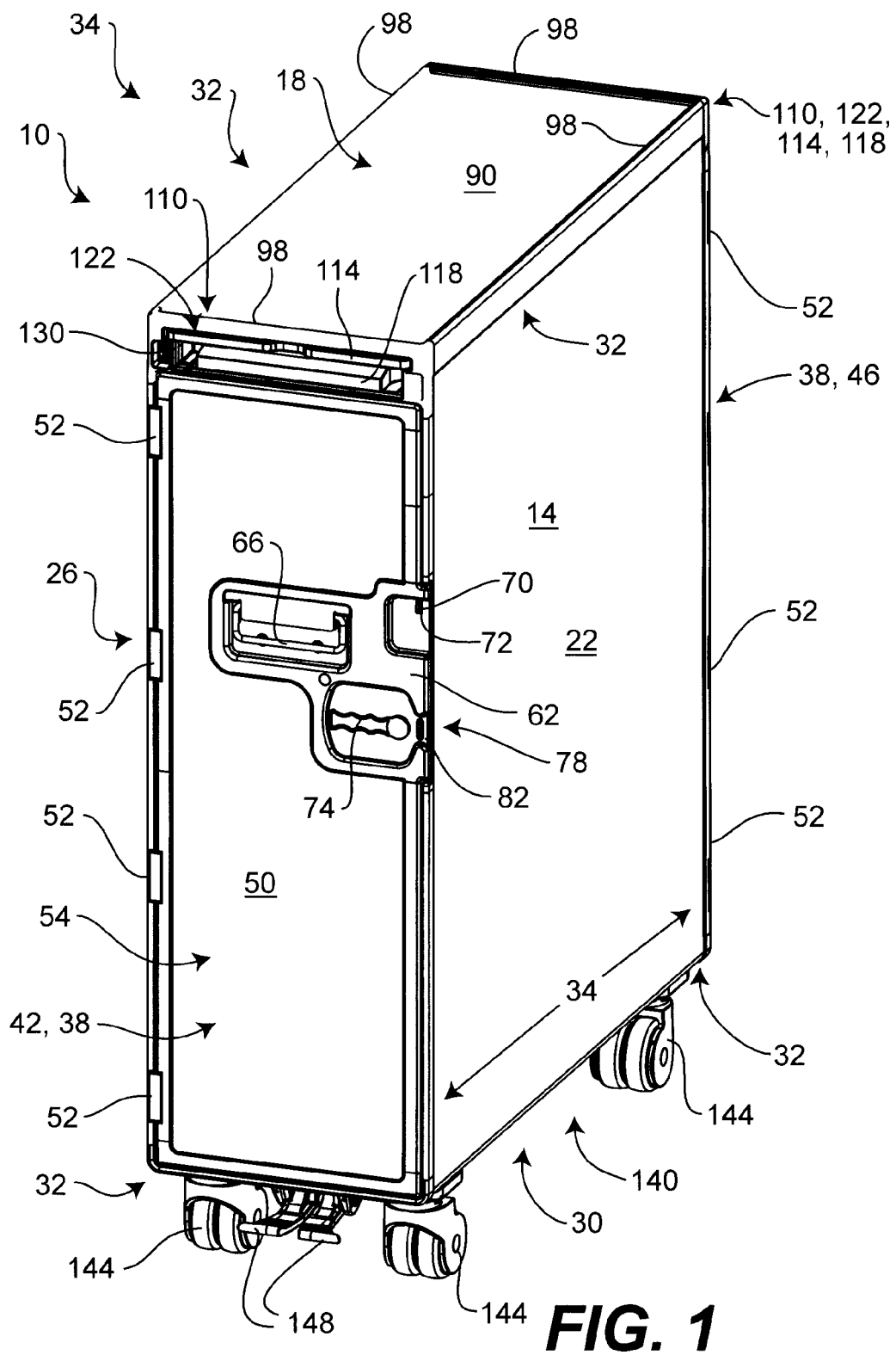
FIG. 1 is a perspective view of a full size service cart in accordance with an embodiment of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in schematic form in order to facilitate describing the present invention.

A service cart 10 adapted to carry goods in accordance with an embodiment of the invention is illustrated in FIG. 1. The illustrated service cart 10 is adapted to be used in a passenger airplane but could alternatively be used in other environments like in a passenger train or, inter alia, in the medical field. The service cart 10 illustrated in FIG. 1 comprises a body 14 defining an upper portion 18, a right lateral portion 22, a left lateral portion 26 and a bottom portion 30. The body 14 can be described as a monocoque construction 34 simultaneously providing the aesthetic envelope of the service cart 10 and the structure that gives its mechanical strength. In other words, the monocoque construction 34 provides a body that is also the structure of the service cart 10 that sustain stresses induced thereto. As it will be described below in respect with at least one embodiment, the monocoque construction 34 uses a composite materials body 14 forming a single part.

The upper portion 18, the right lateral portion 22, the left lateral portion 26 and the bottom portion 30 of the body 14 are connected together in a continuous wall. Illustrative embodiments described herein are using radius portions 32 to interconnect adjacent portions 18, 22, 26, 30. The body 14 of the illustrated embodiment forms a tubular member having four planar side portions 18, 22, 26, 30 forming one part. The side portions 18, 22, 26, 30 can be secured together in one configuration while, alternatively, they can be made of a unitary part in another configuration. Both configurations can be defined as forming a monocoque structure. It can be appreciated that the wall thickness of the portions 18, 22, 26, 30 can have different thicknesses adapted to sustain the specific mechanical loads applied thereto. In other words, the monocoque construction 34 can be optimized to only use the required material at the right place and therefore reducing the weight of the service cart 10 while providing the appropriate mechanical resistance thereto. For example, the upper portion 18 can have a thinner wall section than the bottom portion 30 because the upper portion 18 does not bear the weight of the entire service cart 10. Additional details about the construction of the body 14 will be provided below.

Figure 4:
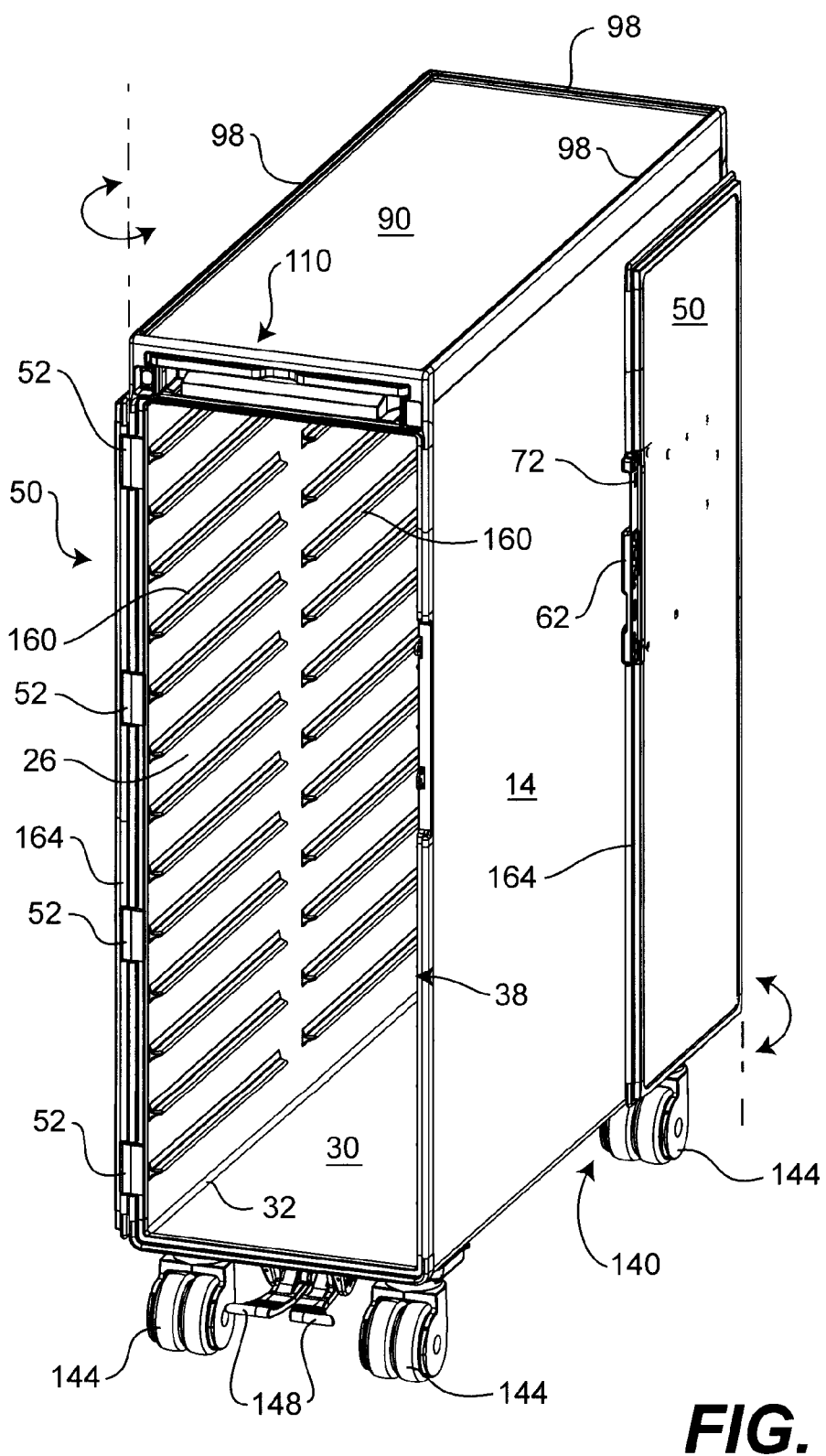
FIG. 4 is a perspective view of a full size service cart with opened doors in accordance with an embodiment of the present invention.

The service cart 10 illustrated in FIG. 1 is a full-size service cart 10 having a predetermined longitudinal length 34 and provided with a door opening 38 on each longitudinal side 42, 46. The length of the full-size service cart 10 is longer than the half-sized service cart 180 discussed below. Conventionally, a full-size service cart for the aeronautical industry is about 810 millimeters. The length of the service carts 10, 180 of at least some embodiments of the invention can vary in respect with the task to be performed without departing from the scope of the invention. Each door 50 is hingedly 52 connected to body 14 and is adapted to pivot between a closed position 54, when mating with its respective door opening 38, and an open position 58 as illustrated in FIG. 4. A reinforcement member 62 recessed into the door 50 provides support for a pulling handle 66 pivotally secured thereon and adapted to pull the door 50. A locking member 70 protruding from the door opening 38 and passing through a corresponding opening 72 in the door 50, when the door 50 is in the closed position 54, to receive a lock (not shown) thereon to prevent opening of the door 50 is also connected to the reinforcement member 62. A handle 74 is pivotally secured to the reinforcement member 62 to selectively disengage a retractable lock member 78 from a cooperating extending stem 82 to open the door 50. The handle 74 can be actuated in both directions to retract the lock member 78 and preferably does not protrude above the surface of the door 50.

Still referring to FIG. 1, the service cart 10 is provided with a cover element module 90 made of moulded plastic to cover the upper portion 18 of the body 14. The cover element module 90 is a portion of the service cart 10 adapted to specialize the service cart 10 for better performing specific tasks while keeping the remaining portions of the service cart 10 substantially unchanged. The cover element module 90 of the present embodiment can be permanently secured to the body 90 with glue, or the like, to improve the shape of the upper portion 18 into a planar working area 94 defined by a peripherical ridge 98 configured to prevent objects or liquids to slide off the upper portion 18 of the body 14. Handles, not illustrated, could alternatively be formed in the cover element module 90 [or directly in the body 14] to be used by a user to propel, pull, drive and steer the service cart 10.

Service cart utility modules are portions of the service cart 10 that can be changed for specializing the service cart 10 without changing the whole service cart 10. The module can be located at various positions on the service cart 10 despite the illustrative examples presented herein are using the upper portion of the service cart 10 to receive modules thereto. The modularity of the present invention can be directed to the service cart manufacturing process by selecting the desired module at the time of permanently assembling the service cart. The modularity of the present invention can equally be directed to ongoing modification to the service cart 10 along its useful life by using non-permanent securing means to secure the module to the service cart 10.

Continuing with FIG. 1, the bottom portion 30 rests on a wheelbase module 140 adapted to pivotally secure thereto four (4) sets of caster wheels 144. Two pedals 148 are also pivotally secured to the wheelbase module 140 to selectively lock or unlock the caster wheels 144 to immobilize the service cart 10.

Figure 2:
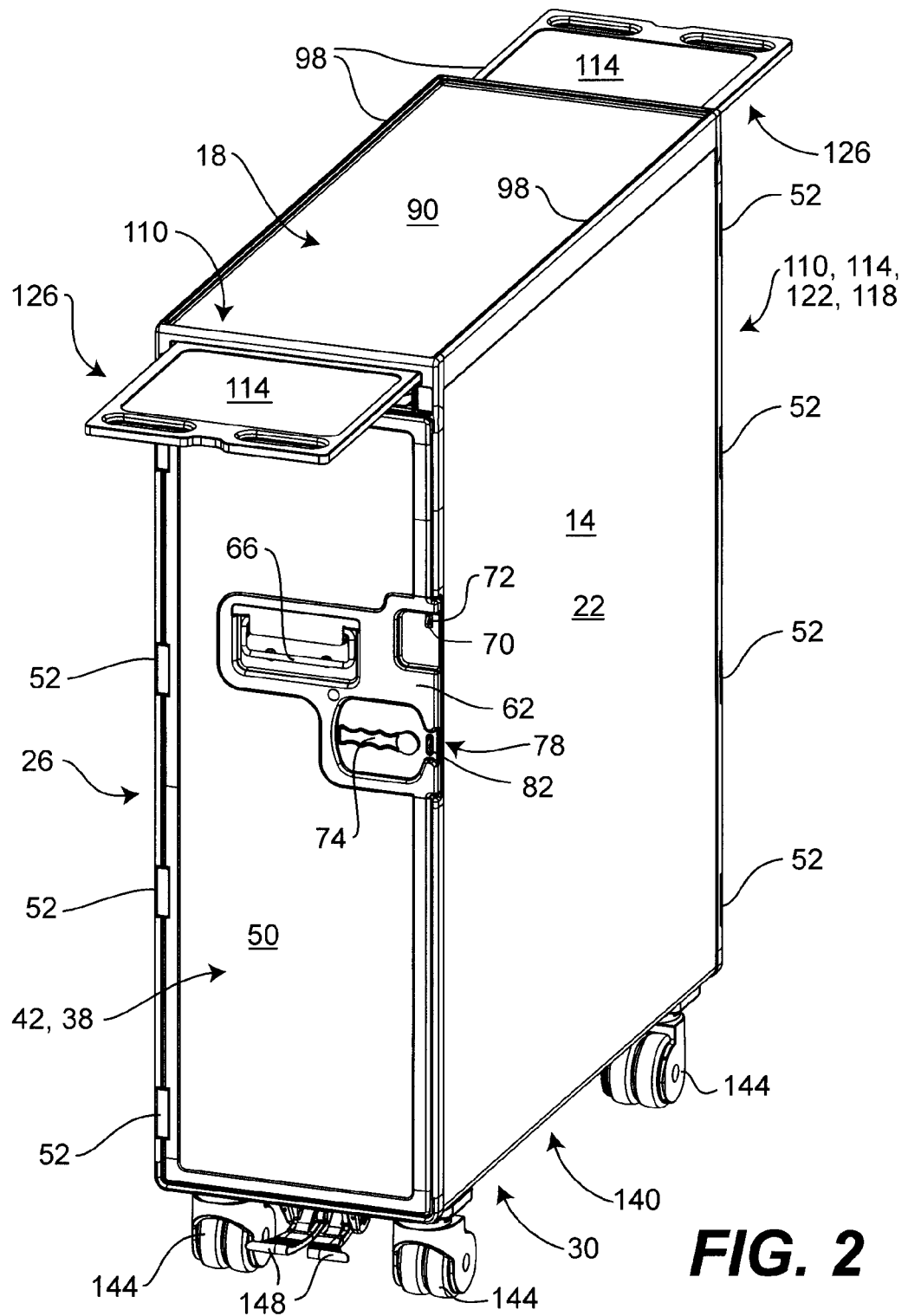
FIG. 2 is a perspective view of a full size service cart in accordance with an embodiment of the present invention.

In the present embodiment, a tablet module 110 is secured inside the body 14, adjacent to the upper portion 18. The tablet module 110 of the illustrated embodiment comprises an extendable tablet 114 and an extendable receptacle 118. The extendable tablet 114 is moveable between a closed position 122 and an opened position 126 as it can better be appreciated in FIG. 2. A locking mechanism 130 prevents the extendable receptacle 118 to extend when undesired. Two handles 134 are defined in the extendable tablet 114 and are accessible when the extendable tablet 114 is slightly extended to drive the service cart 10.

Figure 3:
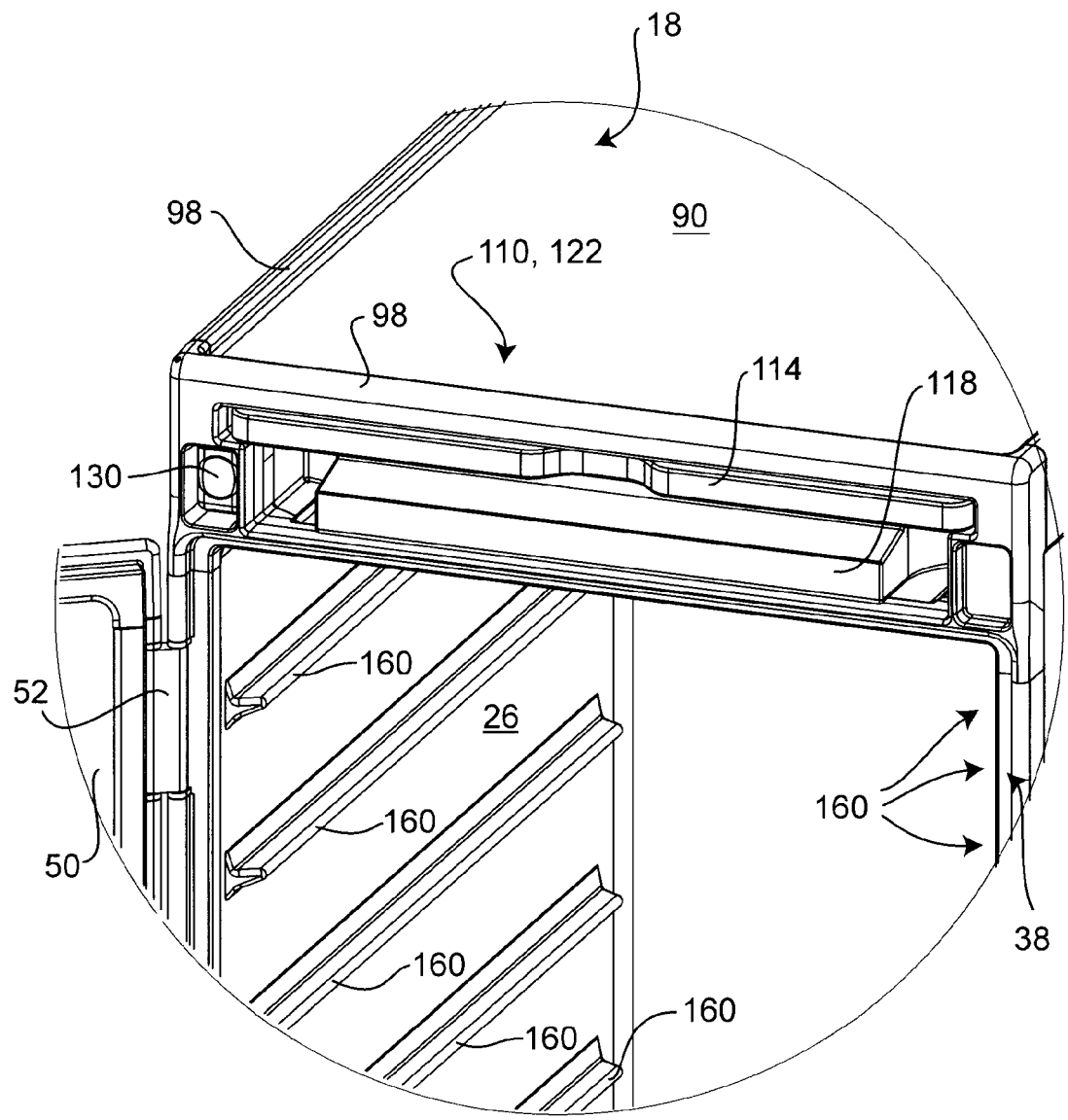
FIG. 3 is a magnified view of a tablet module of the service cart of FIG. 1 in accordance with an embodiment of the present invention.

FIG. 3 is a magnified view of the tablet module 110. The semi-opened door 50 allows seeing the interior of the service cart 10 where a series of parallel rails 160 are visible. The series of rails 160 are secured to the interior side of the lateral walls 22, 26 at a constant interval thereto to slideably receive receptacles (not illustrated) thereon. Dry ice (or means to cool) can be put in the extendable receptacle 118 to cool the interior of the service cart 10. Openings (not visible) disposed on the lower portion of the extendable receptacle 118 are allowing cold air to pass through the extendable receptacle 118 and propagate to the rest of the body 14.

FIG. 4 illustrates the full size configuration service cart 10 with the doors 50 in their respective opened position. Each door 50 can open in a position parallel to an adjacent lateral wall 22, 26. For doing so, the hinge 52 is provided with a double pivot axis adapted to distance the side of the door 50 from the door opening 38 and allow parallel proximity with one of the lateral walls 22, 26.

Figure 5:
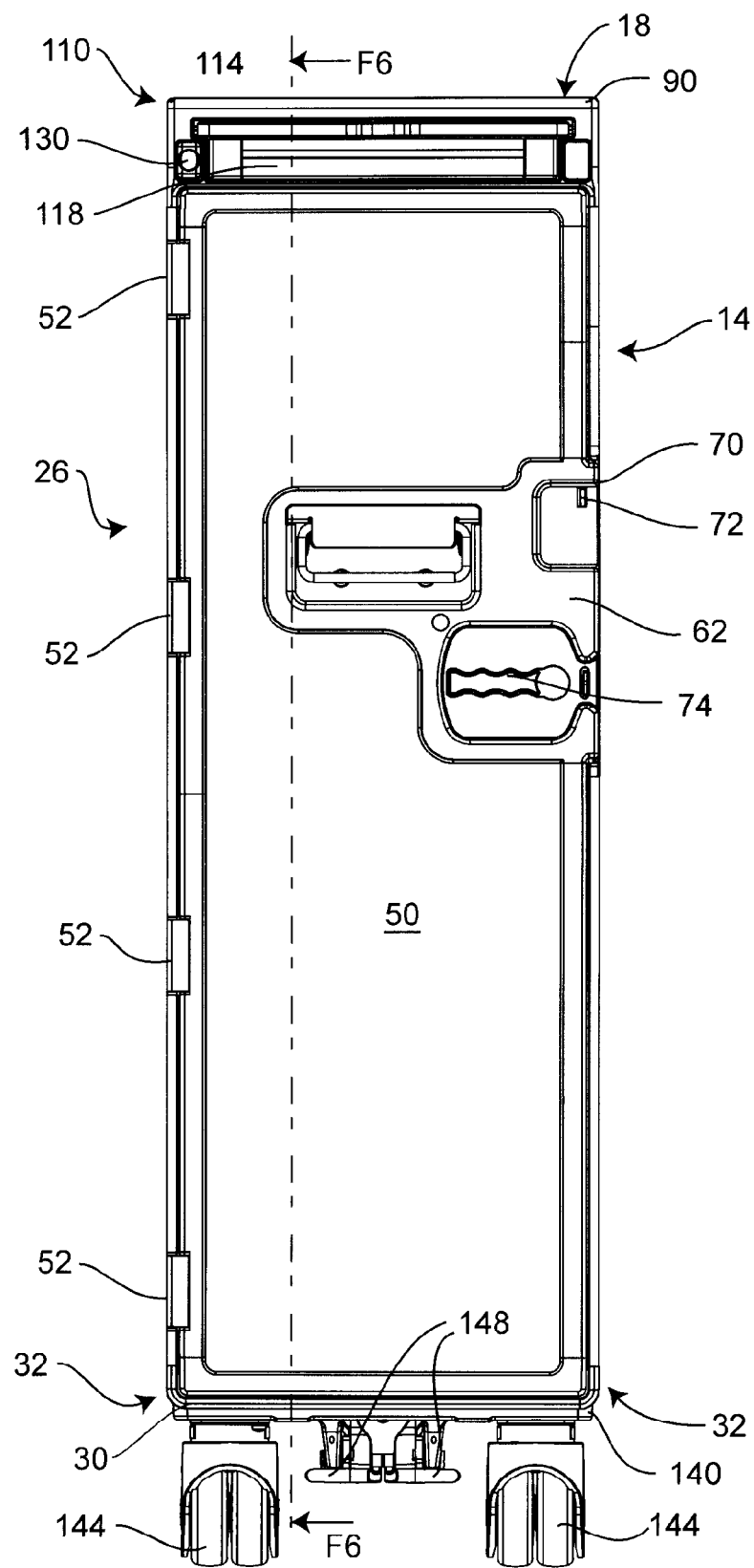
FIG. 5 is a front elevational view of the full size service cart of FIG. 1 in accordance with an embodiment of the present invention.
Figure 6:
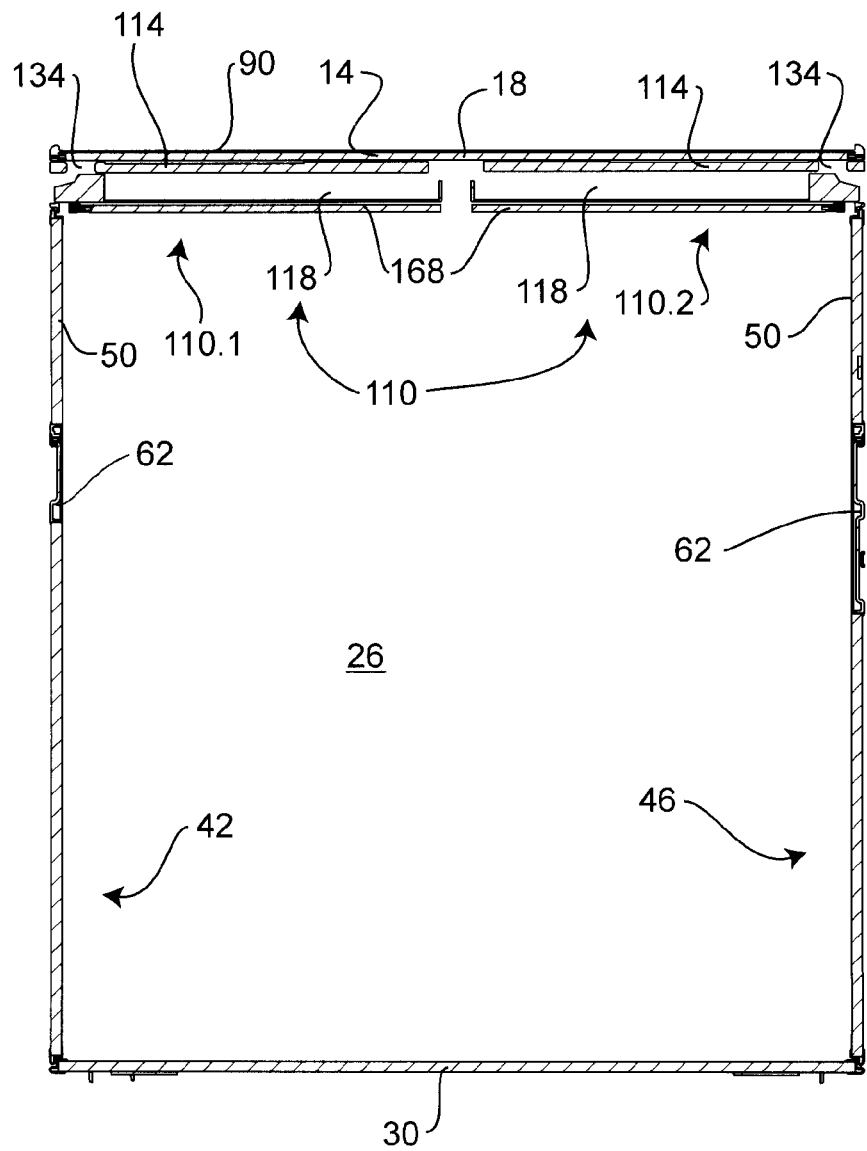
FIG. 6 is a right side elevational section view the full size service cart of FIG. 1 in accordance with an embodiment of the present invention.

Turning now to FIG. 5 depicting the service cart 10 and a section line representing the cut location of the section view illustrated in FIG. 6. FIG. 6 put further emphasis on the mechanical layout of the tablet module 110 inside the body 14. The full size service cart 10 comprises two opposed tablet modules 110.1, 110.2. In other words there are two opposed extendable tablets 114 and two extendable receptacles 118 to respectively be used on each longitudinal side 42, 46 of the full size service cart 10. Each tablet module 110 has a lower wall 168 sized and designed to be secured on each side to the lateral portions 22, 26. The tablet modules 110 of the present embodiment are located inside the body 14 of the service cart 10. Alternatively, the tablet modules 110 could be located outside the body 14 on top of the upper portion 18 and covered by an appropriate cover element module 90.

Figure 7:
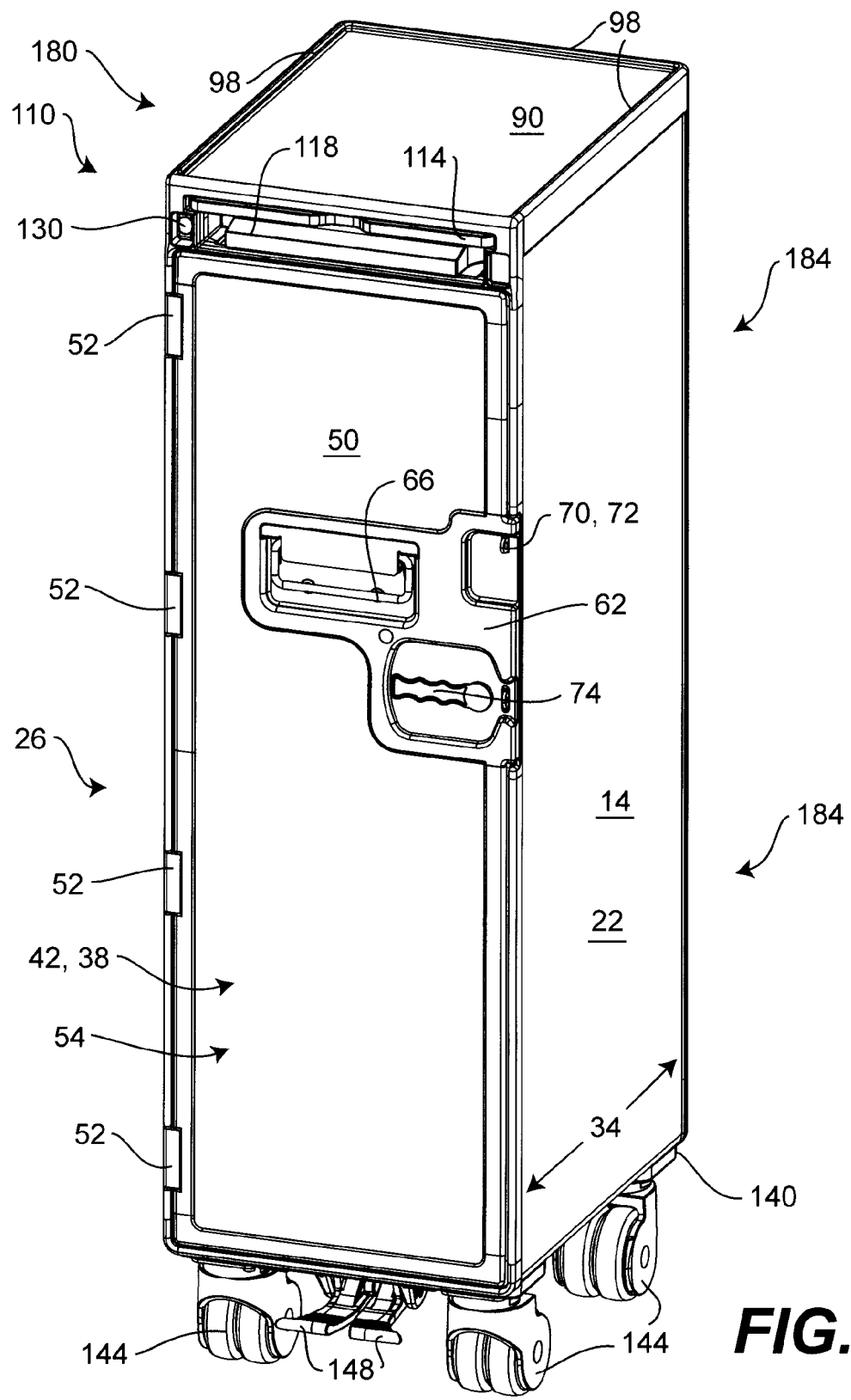
FIG. 7 is a perspective view of a half size service cart in accordance with an embodiment of the present invention.

The full size service cart 10 illustrated in FIG. 1 has a smaller counterpart. A half size service cart 180, as illustrated in FIG. 7, has a smaller size due to its shorter longitudinal length 34. The smaller volume of the half size service cart 180 can contain fewer goods therein but allows more nimble movements.

Figure 8:
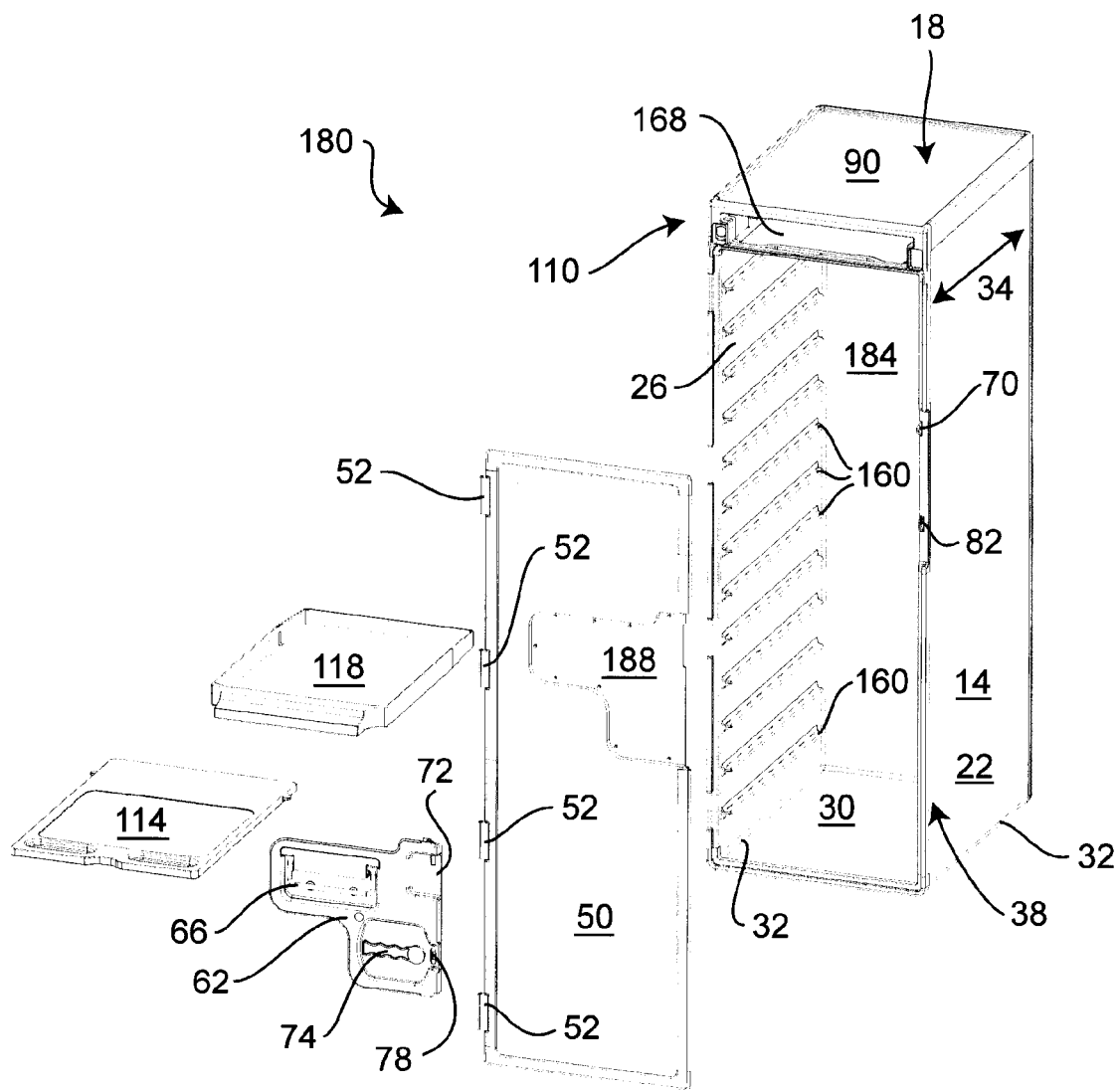
FIG. 8 is a perspective view of a half size service cart in accordance with an embodiment of the present invention.

As it is called, the half size service cart 180 of the present embodiment is about half the length of the full size service cart 10. This is mainly obtained by reducing the length of the body 14 and the cover element module 90, by using a single tablet module 110, a single door 50 and closing the opposite longitudinal side with a back portion 184 that can better be appreciated in FIG. 8. The half size service cart 180 is shown exploded in FIG. 8. Beside the shorter longitudinal length 34 the components of the half size trolley 180 are substantially similar as the components of the full size trolley 10. It can be seen on exploded FIG. 8 that the door 50 has a recessed portion 188 sized and designed to receive therein the lock member 62 such that the lock member 62 and the locking components located thereon do not extend above the external surface of the door 50.

Figure 9:
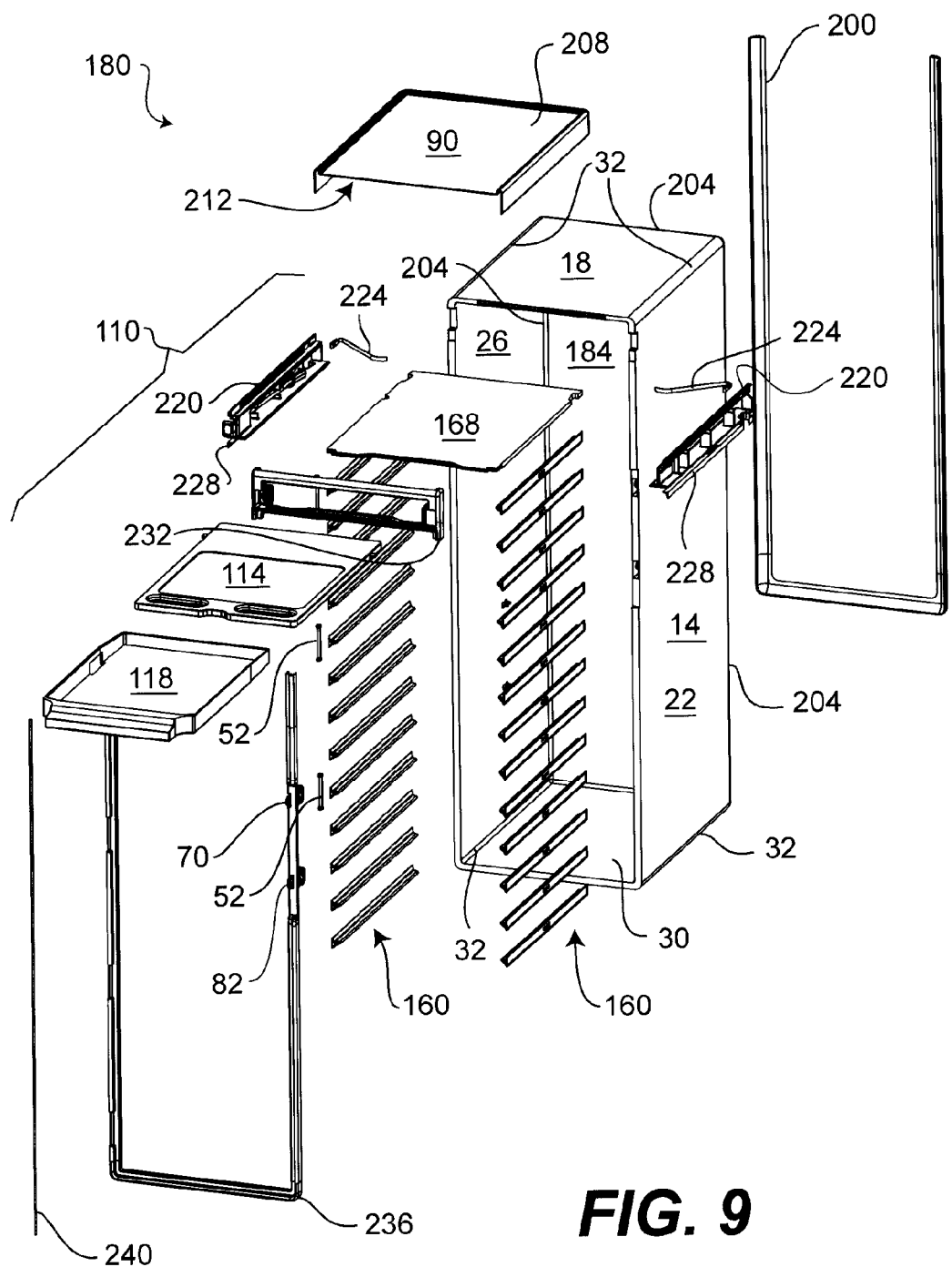
FIG. 9 is an exploded perspective view of a half size service cart in accordance with an embodiment of the present invention.

FIG. 9 illustrates the half size service cart 180 in a more detailed exploded view. Beginning from the back of the service cart 180 it can be appreciated there is a resilient member 200 illustratively adapted to cover the rear edges 204 of the body 14. The resilient member 200 is preferably made of a material capable of absorbing shocks, like rubber or plastic. Additional resilient members can be added on other portions of the service cart 180 if needed to protect the body, or other parts of the service cart 180, against exterior objects that could damage the service cart 180. The resilient member 200 is affixed to a half size service cart 180 in the present embodiment but could also be used on the full size service cart 10 without departing from the scope of the present invention.

The cover element module 90 used on a half size service cart 180 is obviously smaller than the cover element module 90 adapted to be used in conjunction with a full size service cart 10 as illustrated in FIG. 1. The cover element module 90 is preferably made of thermoformable or thermoset polymeric material because it is easy to shape, its low cost, its light weight and the additional features that could be added (i.e. ridges, grooves, logos . . . ). Anti-slip texture can be added on the upper surface 208 of the cover element to prevent objects to slip thereon, to help liquid to drain or to prevent undesired noise to be produced when objects are put thereon. Similarly, a texture could be added on the lower surface 212 to improve adhesion between the cover element module 90, the upper portion 18 and the side portions 22, 26 of the body 14. This might be desirable when the cover element module 90 is glued to the body 14.

Still in FIG. 9, the tablet module 110 is extracted from the interior of the body 14. The extendable tablet 114 and the extendable receptacle 118 are dismantled from the side guides 220 in which they operatively slide between their respective extended and retracted positions. The extendable tablet 114 and/or the extendable receptacle 118 are spring loaded with springs 124 located at the back of the tablet module 110 to facilitate their extensions when they are fully retracted in the body 14. A connection between one end of the spring 224 and its related side guide 220 locates the spring in a position where the spring 224 stores energy therein when the extendable tablet 114 and/or the extendable receptacle 118 are retracted in the body 14. The stored energy is restored when the locking mechanism unlocks the extendable tablet 114 and/or the extendable receptacle 118 from its recessed position to push the tablet or the receptacle out. It is provided by the present document to provide additional springs 224 in the tablet module 110 to preload an additional extendable tablet 114 and/or an additional extendable receptacle 118. Each side guide 220 is secured to the interior wall surface of the body 14 at the appropriate height. The side guides 220 of an embodiment of the present invention are glued to the body 14 using or not an intervening part 228. The present embodiment uses intervening parts 228 to interface between the side guides 220 and the body 14. These additional intervening parts 228 are desirable to better locate the side guides 220 before mounting the whole tablet module 110 in the body 14 as opposed to trying to secure the complete tablet module 110 in the body 14. This is very convenient, when the tablet module 110 is glued to the body 14, to glue the intervening parts 228 to the body 14 and maintain it with a jig, wait for the glue to cure and then secure the remaining parts of the tablet module 110 to the body 14. Another embodiment of the invention (not illustrated) uses fasteners to secure the side guides 220 to the body 14 therefore allowing the side guides 220 to be removed if needed. An alternate embodiment of the invention provides a removable securing mechanism allowing easy and quick removal of the side guides 220 to put some other features useful when the service cart 180 is in use. A front panel 232 is located in front of the tablet module 110 and acts as a finishing element having an aesthetic value. In the present embodiment, the front panel defines an opening adapted to let the extendable tablet 114 and/or the extendable receptacle 118 pass through.

FIG. 9 also depicts a door opening frame 236 having a profile adapted to mate with edges of the body 14 on one side and to receive the door 50, in the closed position 54, on the other side—not illustrated in FIG. 9 but illustrated in FIG. 1. The door-opening frame 236 is firmly anchored on the edge of the body 14 and is secured with an adhesive. In the illustrated embodiment the locking member 70 and the extending stem 82 are moulded in the door-opening frame 236 to ensure sufficient stiffness and avoid transferring directly the load to the body 14. Alternatively, the locking member 70 and the extending stem 82 are glued to the door-opening frame 236. Another embodiment firmly secures the locking member 70 and the extending stem 82 to the body 14 with fasteners and extends through associated openings performed in the door-opening frame 236. Additionally, the door-opening frame 236 further defines a portion of the hinge 52 pivotally securing the door 50 to the body 14. A hinge pivot 240 can be seen in FIG. 9. The long hinge pivot 240 is inserted through alternate openings in the door-opening frame 236, the door 50 and the smaller hinge members associated with reference number 52 in FIG. 9.

Figure 10:
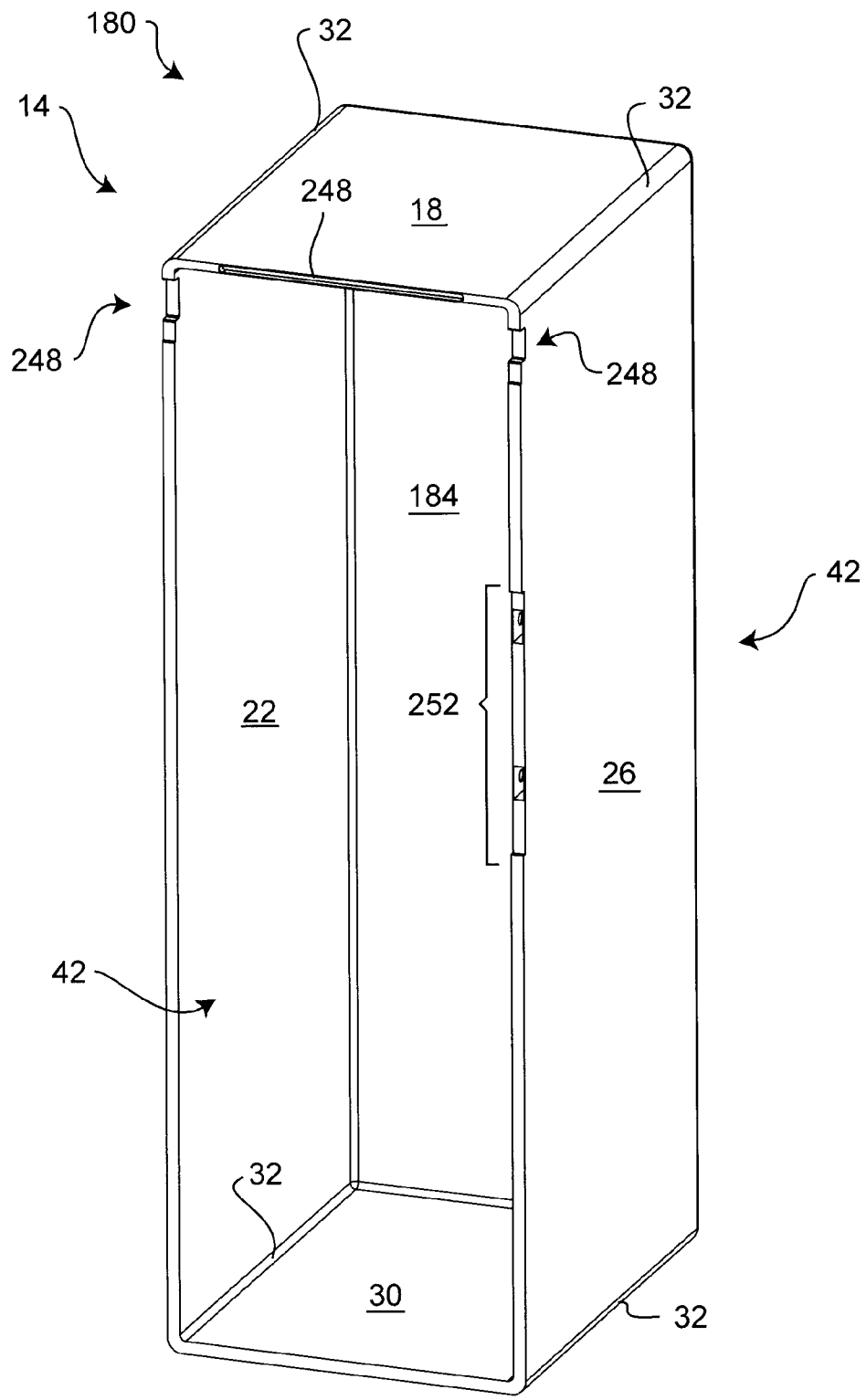
FIG. 10 is a perspective view of a body of a half size service cart in accordance with an embodiment of the present invention.

Turning now to FIG. 10 illustrating an isolated body 14 defining the aforementioned upper portion 18, right lateral portion 22, left lateral portion 26, bottom portion 30 and, because this is the body of a half size trolley 180, a back portion 184. The longitudinal section of the body is clearly illustrated in this Figure. In one embodiment, the upper portion 18, right lateral portion 22, left lateral portion 26 and bottom portion 30, interconnected with radius portions 32, are made of a single part and the back portion 184 is connected to the hollowed body 14 afterward. This allows the hollowed body to have an extrusion-like shape before it is capped on one longitudinal side 42 to provide a half size service cart body 14. Conversely, as explained above in reference with the full size service cart 10, the upper portion 18, right lateral portion 22, left lateral portion 26 and bottom portion 30 interconnected with radius portions 32 are forming the body 14 of the full-size service cart 10.

The upper portion 18, right lateral portion 22, left lateral portion 26, bottom portion 30 are made of composite materials to provide a strong mechanical resistance yet light weight service cart 10, 180. Composite materials are commonly known as a fiber reinforcement fixed with a resin matrix. The composite material is advantageous for its lightweight; its structural benefits and for its thermal efficiency thus providing a good thermal barrier between the inside of the service cart 10 and the outside.

The present application preferably utilizes a liquid Phenolic resin system to infuse dry fabrics (e.g. fibers, reinforcement material, . . . ) in the composite layup by means of vacuum infusion moulding. This enables to reduce the costs of materials while still enabling to mould the composite sandwich layup in a shape of a finished trolley. Additionally, Phenolic resin meets the safety requirement for aviation applications.

Vacuum Infusion Process (VIP) is a common resin infusion fabrication method usable with Phenolic resin that uses vacuum pressure to drive resin into dry fiber-reinforcement material. Materials are laid up dry into the mold and the vacuum is applied before resin is introduced. Once a complete vacuum is achieved, resin is literally sucked into the laminate via carefully placed resin-feed lines. The resin infusion process has been identified as a cost-effective fabrication technique for producing damage tolerant textile composites. Dry textile preforms are resin impregnated, consolidated and cured in a single step eliminating costly prepreg tape manufacture and ply-by-ply layup. VIP uses vacuum bag that is not reusable. The bag is placed over the part and is sealed around the perimeter of the mold with tacky-tape. The layup of material in the VIP consists of fiberglass woven cloth layers; a foam core; Phenolic resin and vacuum bagging accessories.

Continuing with FIG. 10, the forward edge 244 of the body 14 is shaped 248 to accommodate the front panel, on its upper portion 18 and lateral portions 22, 26. Additional forms 252 are performed on the right lateral portion 26 to receive the locking member 70 and the extending stem 82 as taught in an embodiment of the invention. Other forms could be performed on the body 14 to suit various other needs without departing from the scope of the present invention.

Figure 11:
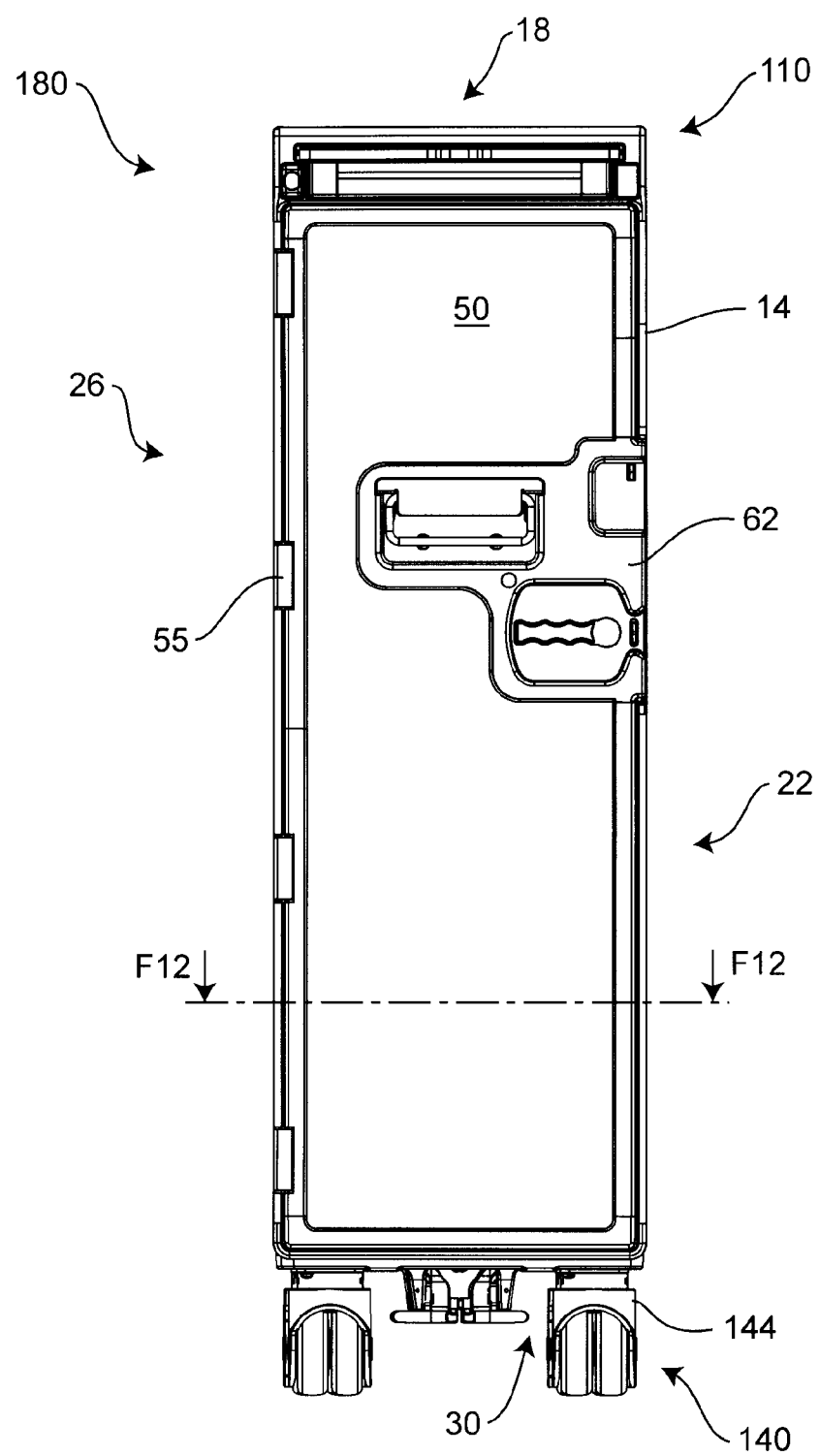
FIG. 11 is a front elevational view of a half size service cart in accordance with an embodiment of the present invention.
Figure 12:
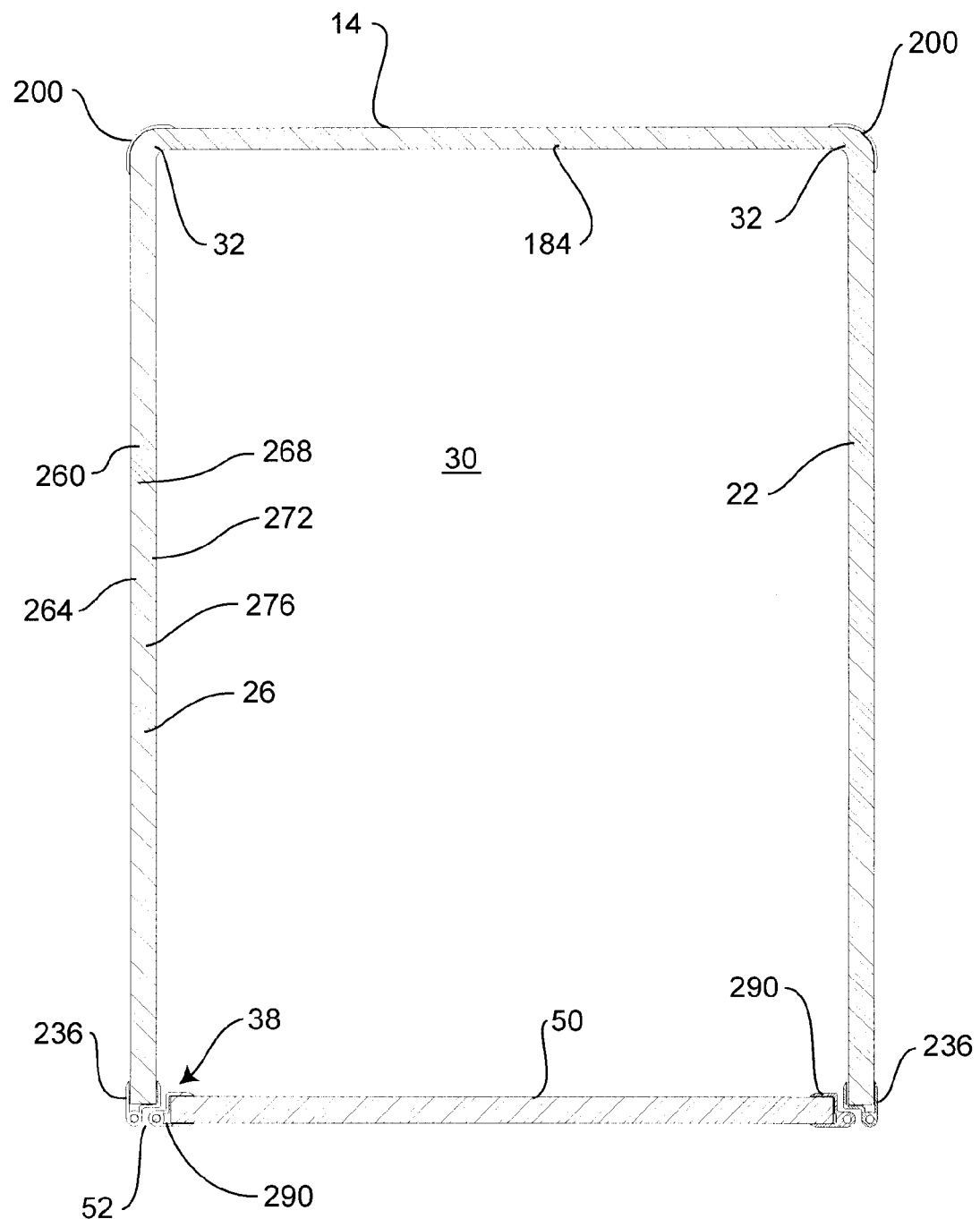
FIG. 12 is a sectional top plan view of a half size service cart in accordance with an embodiment of the present invention.

FIG. 11 is an illustration of a half size service cart 180 with an indication of the section area used by following FIG. 12 where it is possible to appreciate in more details the composition of the composite materials used in the service cart body 14. This top plan view depicts the continuity between the left lateral portion 26, the back portion 184 and the right lateral portion 22. The radius portions 32 ensuring the composite wall continuity are well shown in FIG. 12 with their respective resilient member 200. The composite materials comprise, in an embodiment of the invention, a sandwich structure of an exterior finishing layer 260 used to protect the body 14 and improve its resistance to contacts with exterior objects while giving an alternate aesthetic finish to the body 14. An exterior layer 264 of fibers and Phenolic resin comes next with a core 268 having the role of distancing the interior layer 272 of fibers and Phenolic resin thus increasing the stiffness of the structure. An interior finishing layer 276 used to protect the body 14 and improve its resistance to contacts with interior objects.

Figure 13:
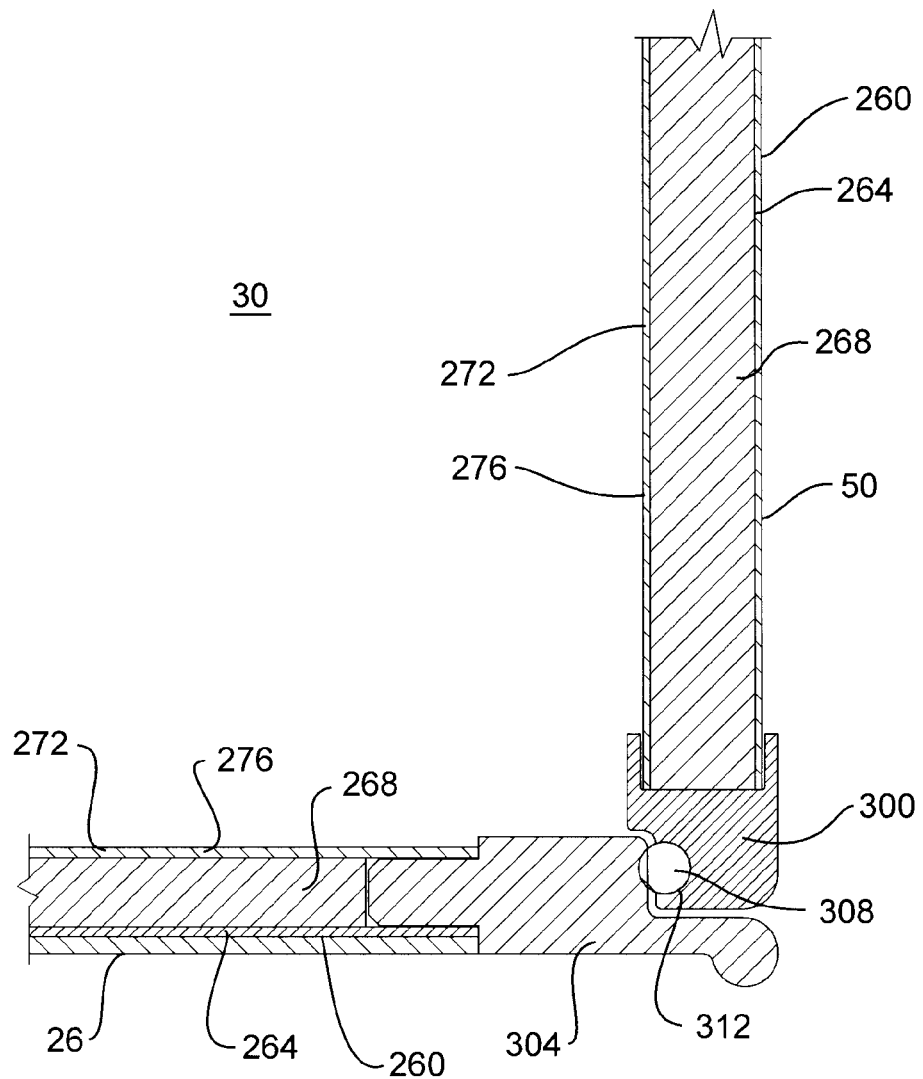
FIG. 13 is a sectional top plan view of a portion of a door closure mechanism of a service cart in accordance with an embodiment of the present invention.

Still in reference with FIG. 12, one can appreciate that the door opening frame 236 of the door opening 38 and the door contour frame 290 are made of the same extruded material. In this embodiment of the invention the same extruded shape is complementarily used for the door-opening frame 236 and the door contour frame 290. The use of a single extruded shape simplifies the assembly and reduces the tooling cost. The shape of the extrusion depicted in FIG. 13 is one workable design. The extruded material is aluminum although other equally suitable material could be used and still be considered within the scope of the present invention (e.g. plastic).

An alternate embodiment of the interface between the door opening frame 236 of the door opening 38 and the door contour frame 290 is illustrated in FIG. 13. Two different shapes of extrusion 300, 304 are used in this embodiment and a seal 308 (an "O" ring) has been inserted in a groove 312 properly sized and designed. This type of design improves the sealing of the door 50 with the body 14 to help improve thermal efficiency of the service cart 10, 180.

Figure 14:
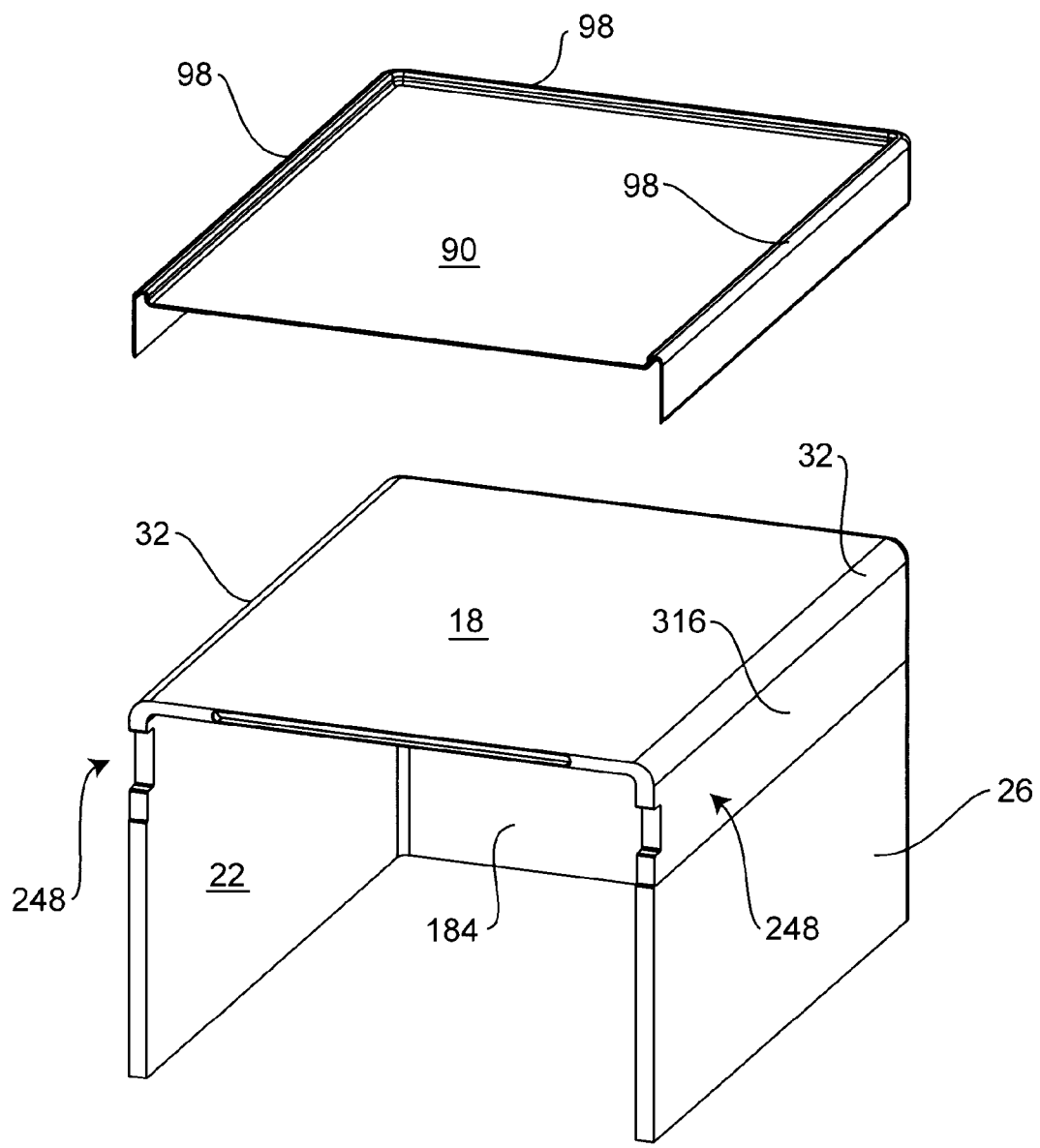
FIG. 14 is a magnified view of a upper portion of a half size service cart in accordance with an embodiment of the present invention.

Moving now to FIG. 14 illustrating a more detailed exploded view of the cover element module 90 with the upper portion 18 of the body 14. The cover element module 90 is designed to slide fit the upper portion of the body 14 and be secured thereto with glue or fasteners. A recessed portion 316 having a depth equivalent to the thickness of the cover element module 90 wall can optionally be performed in the body 14 to ensure an even exterior finish to reduce the risk of hooking exterior objects, like cloths or seat fabric material, when the service cart 10, 180 is used.

Figure 15:
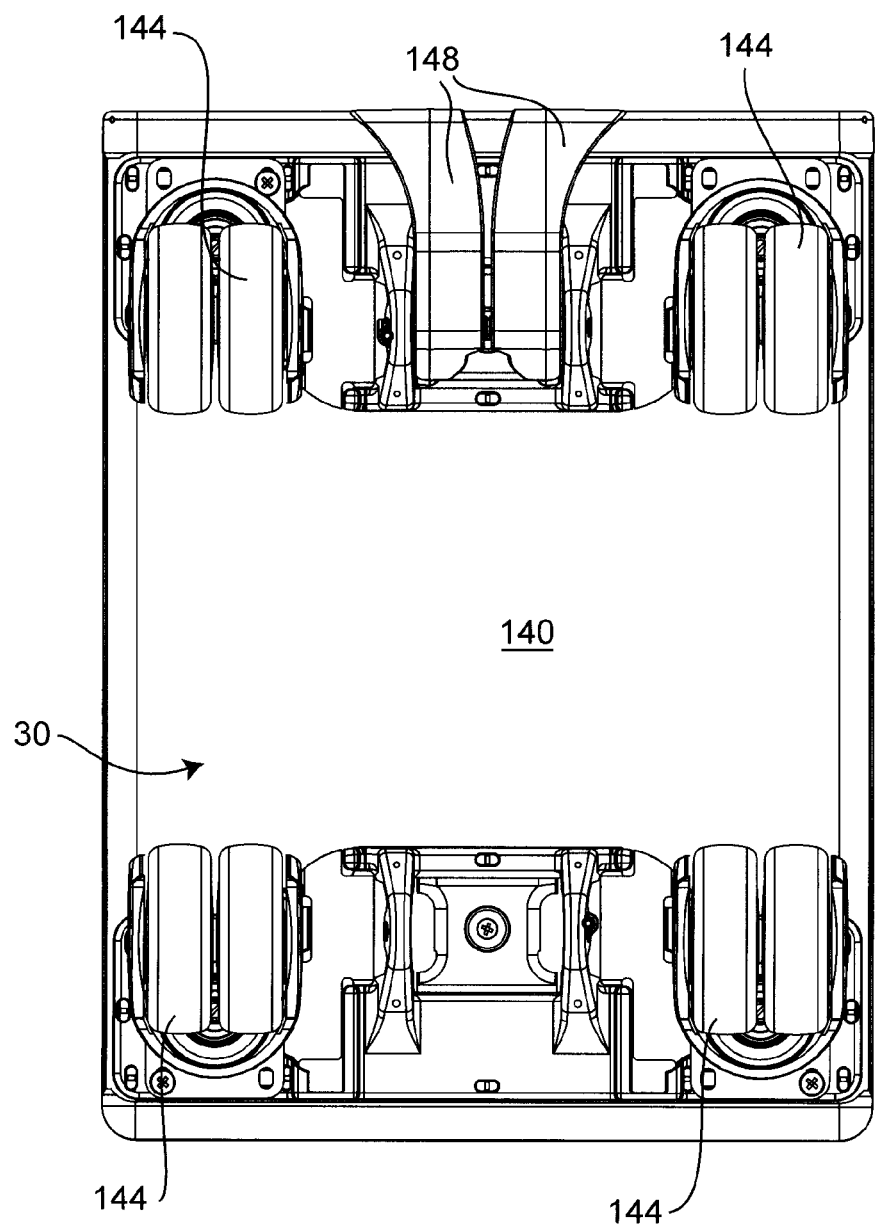
FIG. 15 is a bottom plan view of a half size service cart in accordance with an embodiment of the present invention.

One embodiment of the invention providing a wheelbase 140 adapted to secure caster wheels 144 thereon is shown in FIG. 15. The wheelbase 140, as presented by the present embodiment, is a rigid panel helping distributing the mechanical load from the body 14 to the caster wheels 144. The wheelbase 140 can be glued or secured with fasteners to the bottom portion 30 of the body 14. An alternate embodiment directly secures the caster wheels 140 to the body 14 and a reinforcement plate (not illustrated) disposed inside the body 14 adjacent to the bottom portion 30. The reinforcement plate help distributes the load to the complete bottom portion 30. A quick release mechanism could alternatively be used to easily install and remove the wheelbase 140 from the body 14. The quick release mechanism is a set of three grooved members disposed under the bottom portion 30 and configured to slide therein the wheelbase 140. A locking mechanism is provided to prevent the wheelbase 140 to slide out of the quick release mechanism. Otherwise, the caster wheels 144 can be directly mounted to the body 14 if the strength of the body 14 is sufficient. Caster wheels 144 can alternatively be directly secured to the body 14 if there is no breaking mechanism involved in the service cart 10 assembly.

Figure 16:
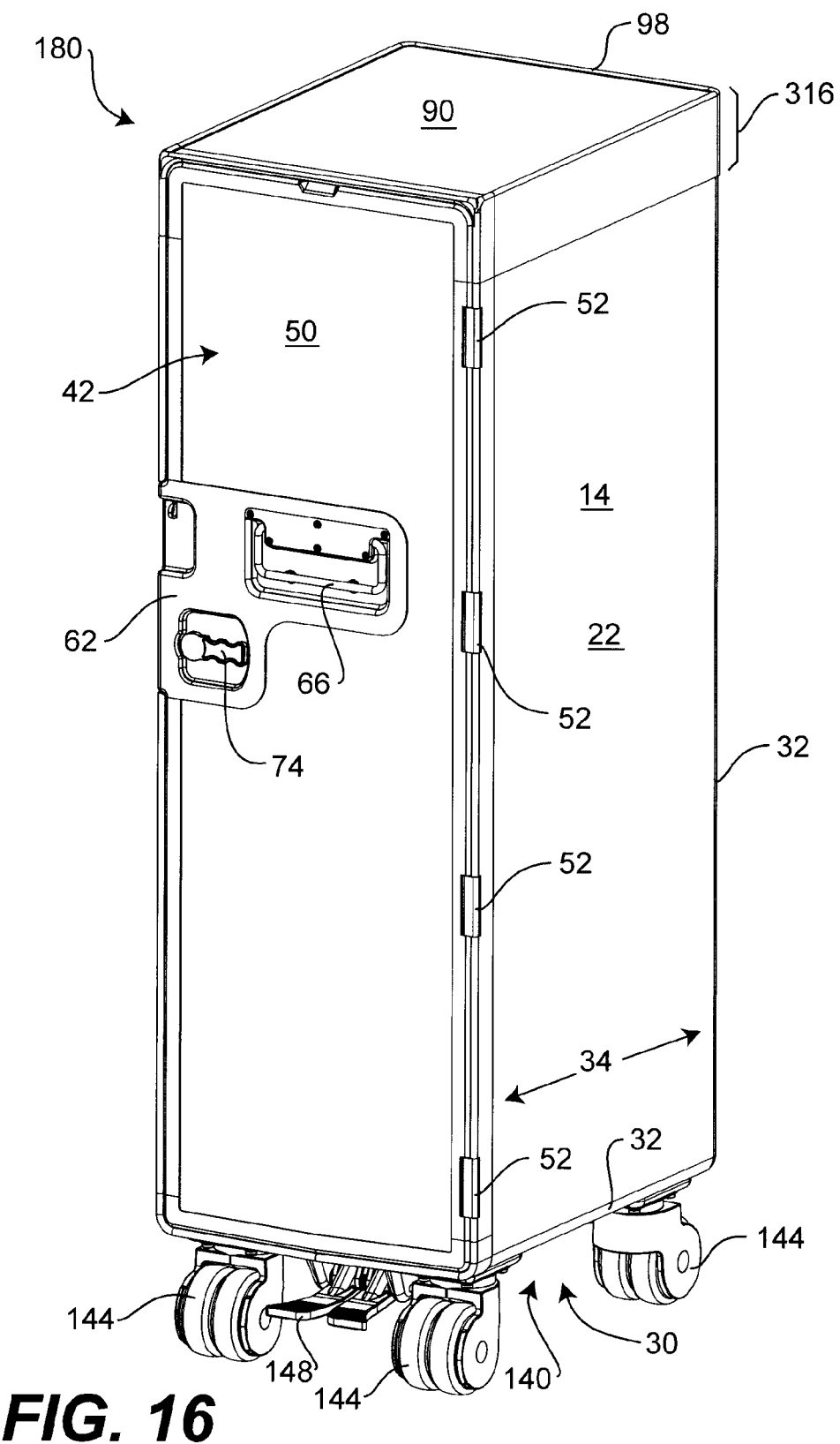
FIG. 16 is a perspective view of a body of a half size service cart in accordance with an embodiment of the present invention.
Figure 17:
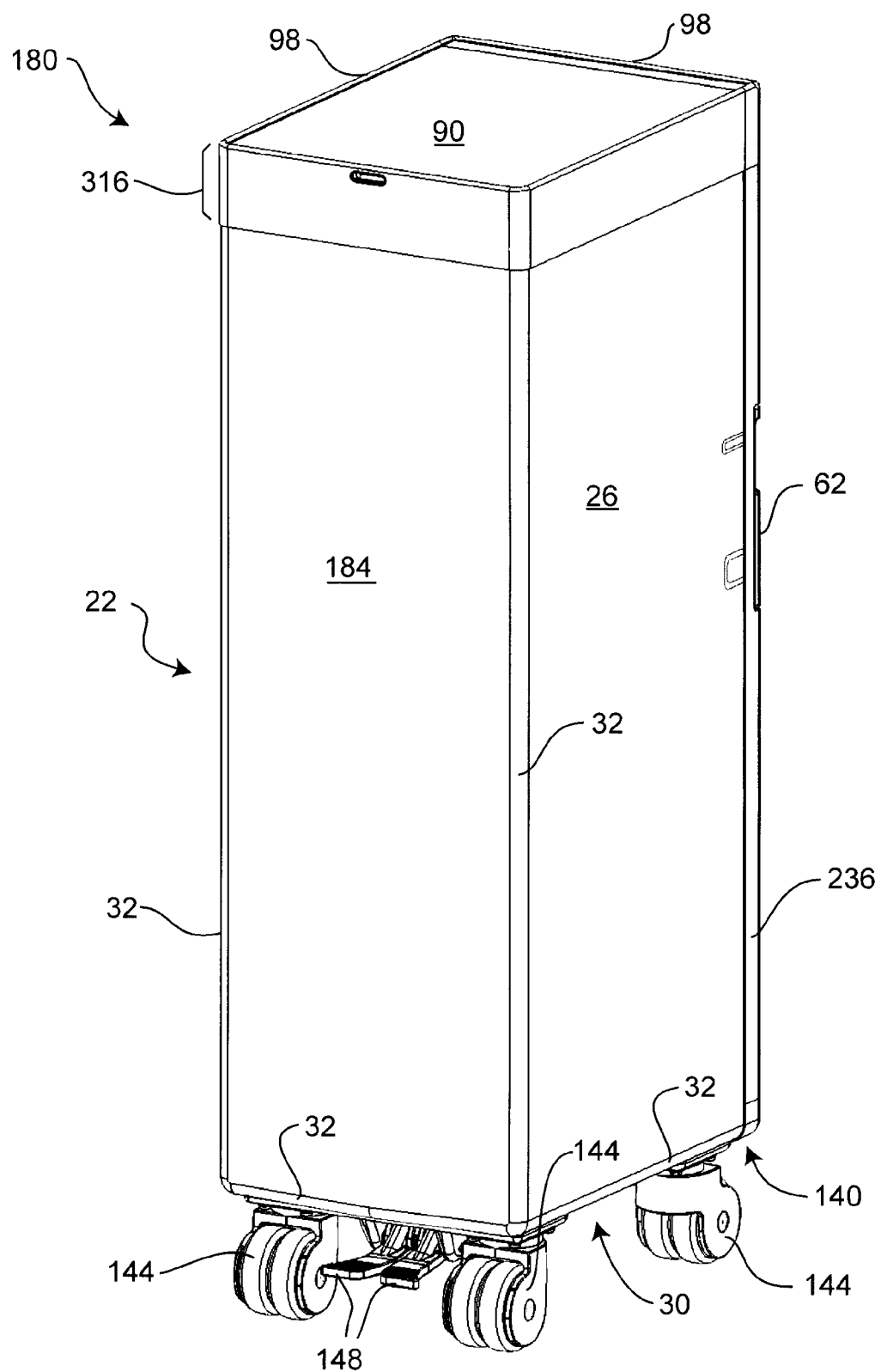
FIG. 17 is a rear perspective view of a body of a half size service cart in accordance with an embodiment of the present invention.

FIG. 16 and FIG. 17 are illustrating another embodiment of the invention. The half size service cart 180 presented herein does not have a tablet module 110 therein. The body 14 of the half size service cart 18 uses the entire volume for receiving goods therein. The door 50 consequently covers the complete longitudinal opening 42 and gives access, when opened, to the complete internal volume of the body 14.

Figure 18:
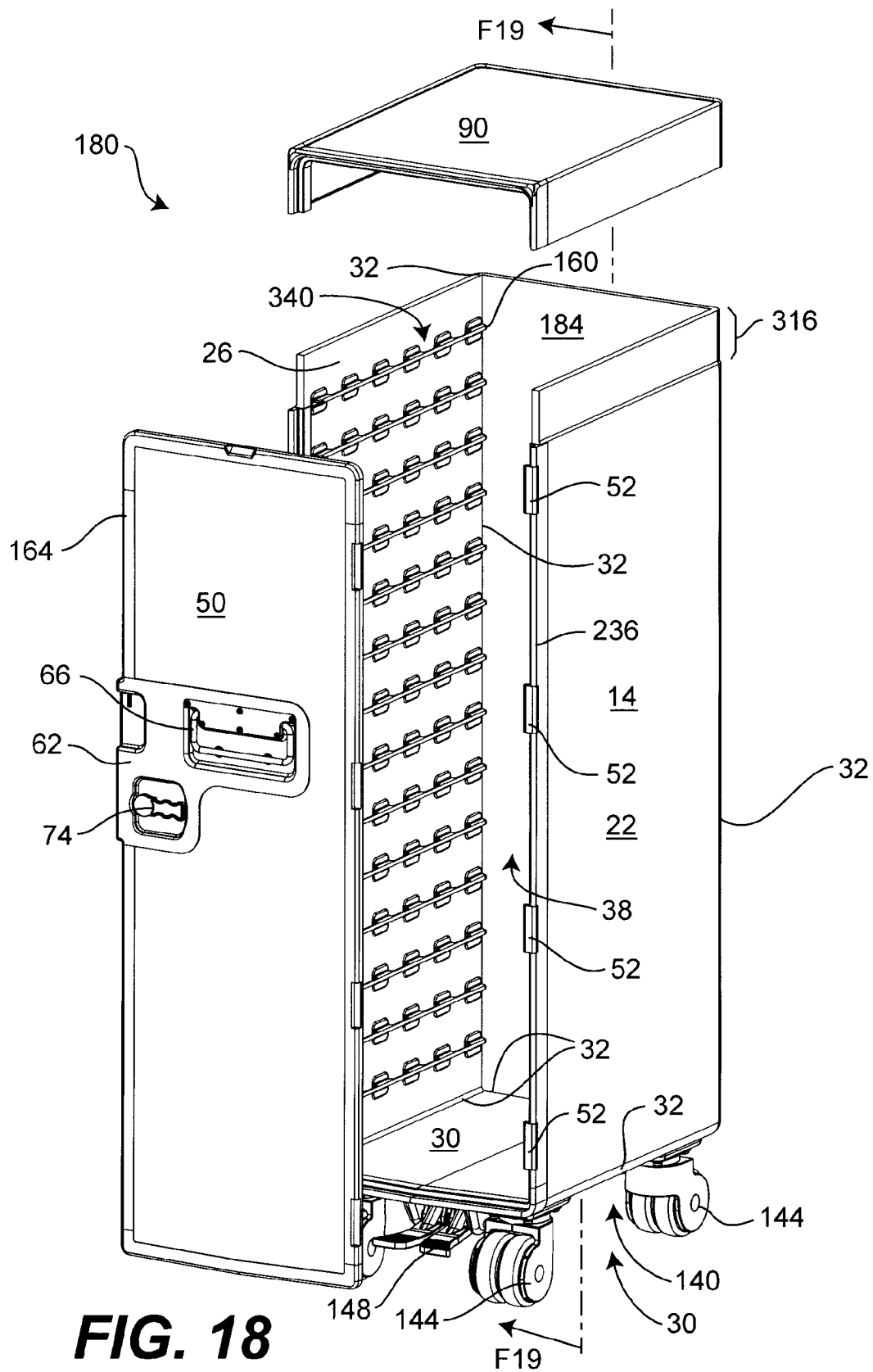
FIG. 18 is a perspective exploded view of a body of a half size service cart in accordance with an embodiment of the present invention.

Turning now to FIG. 18 where is illustrated another half size service cart 180 embodiment comprising a cover element 90 used to replace the upper portion 18. The body 14 of the embodiment illustrated in FIG. 18 is still formed of a right lateral portion 22, a left lateral portion 26, a back portion 184 and a bottom portion 30. However, the upper portion 18 is either removable with the cover element 90 or, if there is no upper portion 18, the cover element 90 is stronger to sustain the loads applied thereon when the service cart 180 is in service.

Figure 19:
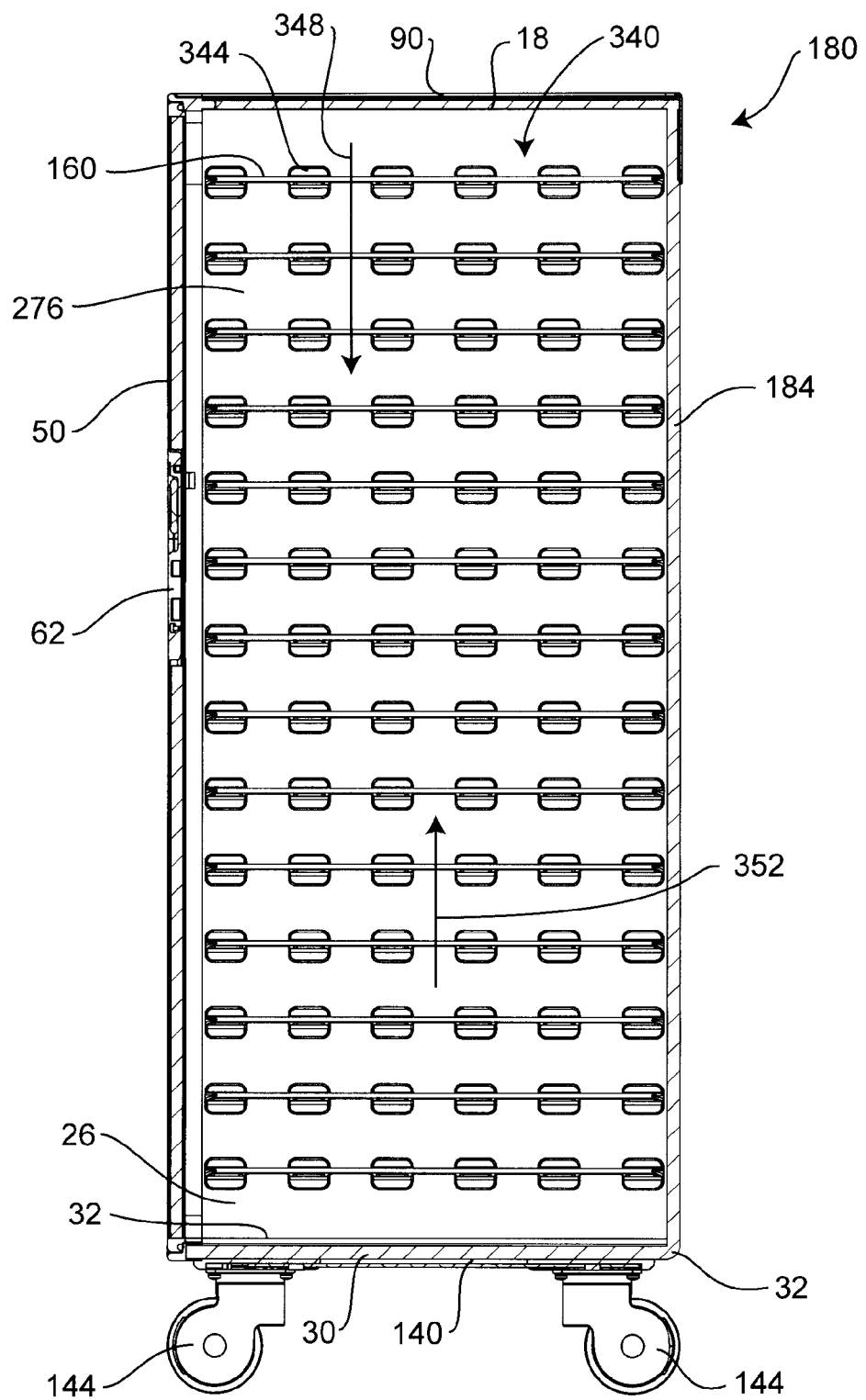
FIG. 19 is a left elevational section view of a half size service cart in accordance with an embodiment of the present invention.

Another inventive element is illustrated in FIG. 18. The rails 160 are provided with a series of air passages 340 adapted to let air pass therethrough for either heating or cooling the content of the body 14. The air passages 340 are disposed next to the wall of their respective lateral portions 22, 26 to avoid being blocked by a bin (not illustrated) disposed thereon and covering a distal portion of the rail 160. This air exchange system allows a better passive convection inside the body 14. A magnified view of the series of rails 160 provided with air passages 160 is illustrated in FIG. 19. The air can pass through the air passage 160 either downwardly 348 (cold) or upwardly 352 (warm).

Figure 20:
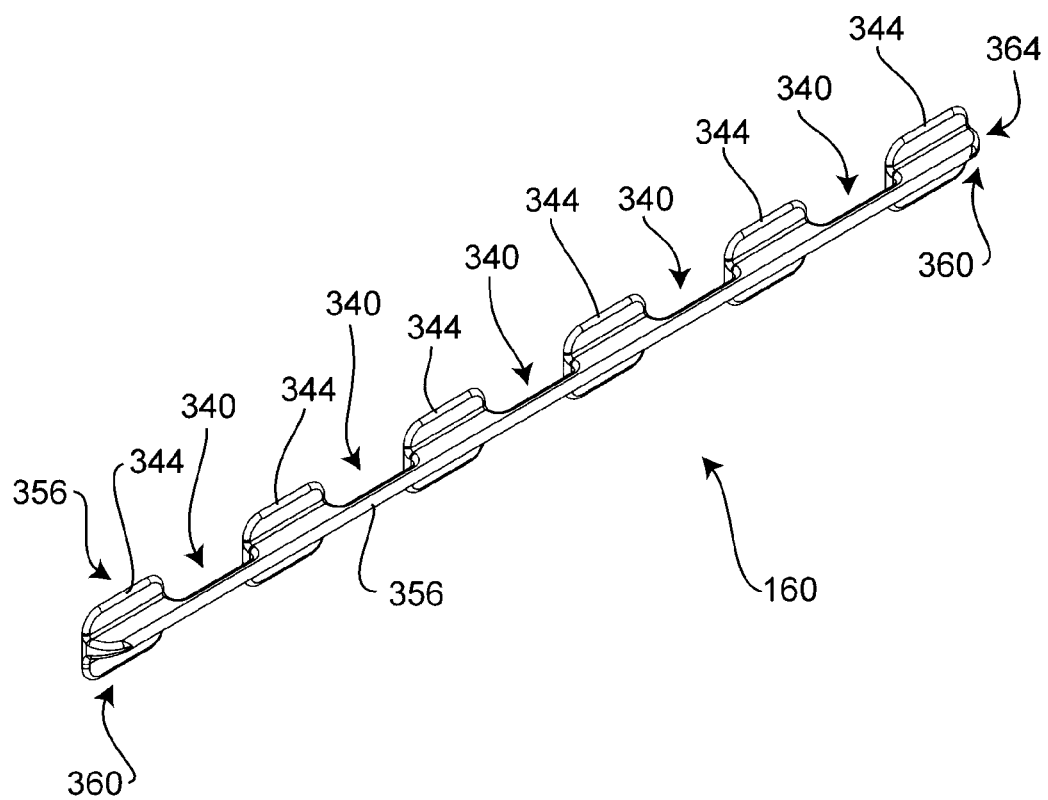
FIG. 20 is a perspective view of a rail of a service cart in accordance with an embodiment of the present invention.

A further magnified isolated rail 160 is illustrated in FIG. 20. A skilled reader can appreciate there are a series of air passages 160 disposed along each rail 160. Each air passage 340 is disposed on the side of the rail 160 to be affixed to the interior wall of the body 14 by gluing each leg 344 to the body 14. A jig is preferably be used to ensure proper positioning of the rail 160 and optimal pressure on the leg 344 to create a good adherence with the body 14. Each air passage 340 is a cavity that communicates with the wall of the body 14. A continuous portion 356 remains to slidably receive a bin thereon. Alternatively, the air passage 340 could be an opening in the rail 160 without directly communicating with the wall of the body 14. The embodiment presented herein illustrates vertically aligned air passages 340. Non-vertically aligned air passages 340 are also within the scope of the present invention despite it is not illustrated herein.

The end of the rail 160 presented in the embodiment of FIG. 20 is angled/curved 360 to facilitate the insertion of a bin thereon. However, this curved design 360 can become a ramp to force the right lateral portion 22 and the left lateral portion 26 apart when a bin, cantilevered on the rails 160, is pushed downward. The corresponding grooves in the bin will slip on the angled/curved 360 end of the rails 160 and derail from the rails 160 when the right lateral portion 22 and the left lateral portion 26 are distanced apart by the same movement. A substantially square end 364 would help prevent this ramp effect and preclude the bin to derail.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A service cart adapted to be moved along an aisle, the service cart comprising:
   a body made of composite materials with phenolic resin therein, wherein the composite materials comprise two layers of matrix and resin, distanced by an intervening foam core, the body defining an upper portion, a lower portion, a back portion and two opposed lateral portions respectively disposed between the upper and the bottom portions, the portions being interconnected with intervening curved portions to form a continuous wall thereof and at least one longitudinal opening opposed to the back portion;
   wheels attached to a lower portion of the body for supporting the body; and
   a closing device for substantially closing the longitudinal opening.

2. The service cart of claim 1, wherein the body is made of a single part.

3. The service cart of claim 1, wherein the body is a combination of a plurality of cooperating parts substantially seamlessly secured theretogether.

4. The service cart of claim 1, further comprising a tablet module disposed in the body.

5. The service cart of claim 1, wherein the continuous wall has a variable thickness.

6. The service cart of claim 1, wherein the back portion is integrally formed with the body.

7. The service cart of claim 1, further comprising a tablet module disposed outside the upper portion of the body.

8. The service cart of claim 1, wherein the closing device for substantially closing the at least one longitudinal opening is a door pivotally attached to the body and adapted to mate with the at least one longitudinal opening.

9. The service cart of claim 1, further comprising a cover element affixed to the upper portion of the body.

10. The service cart of claim 1, further comprising a bumper disposed on the body to protect the body against impacts with foreign objects.

11. The service cart of claim 1, wherein the body comprises one of a first longitudinal length, to form a first size service cart, and a second longitudinal length, to form a second size service cart, the second size service cart being longitudinally shorter than the first size service cart.

12. The service cart of claim 11, wherein the opening is a first longitudinal opening and the closing device is a first closing device, the first size service cart further comprising a second longitudinal opening, opposed to the first longitudinal opening, replacing the back portion and a second closing device adapted to substantially close the second longitudinal opening.

13. The service cart of claim 1, further comprising an extendable tablet adapted to selectively move between a retracted position and an extended position, the extendable tablet, in the retracted position, being mostly disposed within the body.

14. The service cart of claim 13, wherein the extendable tablet is slideably secured to an interior wall of the body with an interface member.

15. A service cart kit adapted to be moved along an aisle, the service cart kit comprising:
   a first size service cart comprising
      a first body having a first longitudinal length and defining two opposed longitudinal openings, the first body being made of composite materials with phenolic resin therein, wherein the composite materials comprise two layers of matrix and resin, distanced by an intervening foam core, the body defining an upper portion, a lower portion and two opposed lateral portions respectively disposed between the upper and the bottom portions, the portions being interconnected with intervening curved portions to form a continuous wall thereof;
      wheels attached to a lower portion of the body for supporting the body; and
      two closing devices pivotally attached to the body and adapted to substantially mate with their respective opening, and
   a second size service cart comprising
      a second body having a second longitudinal length smaller than the first longitudinal length, the second body being made of composite materials with phenolic resin therein, wherein the composite materials comprise two layers of matrix and resin, distanced by an intervening foam core, the body defining an upper portion, a lower portion, a back portion and two opposed lateral portions respectively disposed between the upper and the bottom portions, the portions being interconnected with intervening curved portions to form a continuous wall thereof and at least one longitudinal opening opposed to the back portion;
      wheels attached to a lower portion of the body for supporting the body; and
      one closing device pivotally attached to the body and adapted to mate with the opening.

16. The service cart kit of claim 15, wherein the bodies have a substantially similar section.

17. The service cart kit of claim 15, wherein at least one of the first body and the second body has a tablet module affixed to the body.

18. The service cart kit of claim 15, wherein the portions being interconnected with intervening curved portions to form a continuous wall thereof, the continuous wall further having a variable thickness.

19. A method of manufacturing a service cart adapted to be moved along an aisle, the method comprising:

providing a body made of composite materials with phenolic resin therein, wherein the composite materials comprise two layers of matrix and resin, distanced by an intervening foam core, the body comprising an upper portion, a lower portion, a back portion and two opposed lateral portions respectively disposed between the upper and the bottom portions, the portions being interconnected with intervening curved portions to form a continuous wall thereof, the body defining a longitudinal opening thereof opposed to the back portion, providing a set of wheels adapted to be attached to the lower portion of the body for supporting the service cart; and securing the set of wheels to the body.

* * * * *